US007876312B2

(12) United States Patent
Kodama et al.

(10) Patent No.: US 7,876,312 B2
(45) Date of Patent: Jan. 25, 2011

(54) WRITING DEVICE FOR COLOR ELECTRONIC PAPER

(75) Inventors: Yoshiyuki Kodama, Chino (JP); Kazunori Hiramatsu, Okaya (JP)

(73) Assignee: Seiko Epson Corporation (JP)

( * ) Notice: Subject to any disclaimer, the term of this patent is extended or adjusted under 35 U.S.C. 154(b) by 692 days.

(21) Appl. No.: 11/862,486

(22) Filed: Sep. 27, 2007

(65) Prior Publication Data

US 2008/0024460 A1 Jan. 31, 2008

Related U.S. Application Data

(62) Division of application No. 10/784,126, filed on Feb. 20, 2004, now Pat. No. 7,292,231.

(30) Foreign Application Priority Data

Feb. 21, 2003 (JP) ............................ 2003-044357
Mar. 27, 2003 (JP) ............................ 2003-088795

(51) Int. Cl.
*G06F 3/041* (2006.01)

(52) U.S. Cl. ....................... 345/173; 345/156; 313/504; 428/690

(58) Field of Classification Search ................. 345/107; 347/111-170; 359/296; 313/504; 428/690
See application file for complete search history.

(56) References Cited

U.S. PATENT DOCUMENTS 6,473,072 B1 * 10/2002 Comiskey et al. ........... 345/173
6,707,479 B1 3/2004 Pan et al.
6,922,204 B2 7/2005 Kanazawa et al.
6,982,734 B2 * 1/2006 Pan et al. .................... 347/120
2002/0167480 A1 11/2002 Johnson et al.
2004/0145562 A1 7/2004 Horikiri
2006/0210339 A1 9/2006 Shimoda et al.
2007/0153361 A1 * 7/2007 Danner et al. ............... 359/296

FOREIGN PATENT DOCUMENTS

| | | |
|---|---|---|
| JP | 2000-035598 | 2/2000 |
| JP | 2000-127478 | 9/2000 |
| JP | 2003-295236 | 10/2003 |

* cited by examiner

*Primary Examiner*—Nitin Patel
(74) *Attorney, Agent, or Firm*—Harness, Dickey & Pierce, P.L.C.

(57) ABSTRACT

A writing device is provided for color electronic paper which is capable of performing full color display. The writing device includes a head unit, a head unit moving mechanism which moves the head unit in a first direction, a feeding mechanism which moves electronic paper, and a controller. The head unit includes a writing head, an LED which emits light of three primary colors, an image sensing element consisting of a CMOS sensor, and an optical system. The writing head includes an optically transparent head main portion provided with pixel electrodes, and a common electrode (counter electrode). In the controller, an arrangement of three types of microcapsules in a microcapsule layer is detected to perform electric field formation for each of the pixel electrodes based on a detection result.

12 Claims, 22 Drawing Sheets

WRITING DEVICE FOR COLOR ELECTRONIC PAPER

RELATED APPLICATIONS

This application is a divisional of U.S. patent application Ser. No. 10/784,126 filed on Feb. 20, 2007, which claims priority to Japanese Patent Application No. 2003-088795 filed Mar. 27, 2003 and 2003-004357 filed Feb. 21, 2003. The disclosures of the above applications are incorporated herein by reference.

BACKGROUND OF THE INVENTION

1. Field of the Invention

The present invention relates to a writing device for color electronic paper which is capable of performing full color display.

2. Related Art

As a non-luminous type display device, there is known an electrophoretic display device which utilizes an electrophoresis phenomenon. The electrophoresis phenomenon is a phenomenon in which, when an electric field is applied to a dispersion liquid having particulates dispersed in a liquid phase dispersion medium, particles naturally charged by the dispersion (electrophoretic particles) migrate according to a Coulomb force.

In a basic structure of the electrophoretic display device, one electrode is opposed to the other electrode at a predetermined interval, and the dispersion liquid (electrophoretic dispersion liquid) is encapsulated between the electrodes. In addition, at least one electrode is made transparent, and this transparent electrode side is set as an observation surface. When a potential difference is applied between both the electrodes, electrophoretic particles are attracted to one of the electrodes depending upon a direction of an electric field.

Consequently, if the dispersion medium is dyed with a dye and the electrophoretic particles are constituted by pigment particles in this structure, a color of the electrophoretic particles or a color of the dye can be seen from the transparent observation surface according to a direction of an electric field. Therefore, an image can be displayed by forming the electrodes in a pattern associated with respective pixels to control a voltage to be applied to respective pixel electrodes.

Such an electrophoretic display device attracts attention as an electrooptic device which is preferable for a new display because the electrophoretic display device has advantages such as a simple structure, a wide viewing angle, low power consumption, and a performance for maintaining a displayed image (a memory property).

As an example of the electrophoretic display device, there is known a microcapsule type electrophoretic display device. In this device, a layer consisting of a plurality of microcapsules containing electrophoretic dispersion liquid is arranged between electrodes opposed to each other as an electrophoretic layer.

In order to perform full color display with the microcapsule type electrophoretic display device, a layer consisting of three types of microcapsules, which are formed so as to be capable of displaying one color among predetermined three primary colors, respectively, is required as the electrophoretic layer. As an example of the microcapsule type electrophoretic display device capable of performing full color display, JP-A-2000-35598 discloses an electrophoretic display panel including a microcapsule layer in which the three types of microcapsules are arranged orderly, a pixel electrode for each microcapsule, and a common electrode which is in contact with all the microcapsules.

On the other hand, JP-A-2000-127478 discloses a microcapsule type electrophoretic display device which is divided into a display medium with a structure, which includes a microcapsule layer but does not include a drive circuit and electrodes, and a writing device having electrodes and a drive circuit. In addition, JP-A-2000-127478 describes "electronic paper", which includes a sheet-like base material (paper) having flexibility and a microcapsule layer which is formed on the base material and has a plurality of microcapsules arranged in a planar shape and fixed by a binder therein, as the display medium.

Such electronic paper has an advantage that, while the electronic paper can perform the same high definition display as the display panel of the electrophoretic display device, it can be easily carried because it does not have a drive circuit and electrodes, and it is possible to rewrite a color image on the electronic paper with a writing device.

On the other hand, office documents have made progress in colorization through spread of color printers, and an electronic paper is required with full color display.

It will be possible to rewrite a color image with the electronic paper as a medium by dividing the microcapsule type electrophoretic display device capable of performing full color display into color electronic paper and a writing device. However, at the present point, there is no writing device which can perform rewriting with respect to the color electronic paper. It is difficult to perform writing with respect to the color electronic paper with the writing device described in JP-A-2000-127478.

SUMMARY OF THE INVENTION

The present invention has been devised in order to solve the problems of the related art, and it is an object of the present invention to provide a writing device for color electronic paper which is capable of performing full color display.

In order to solve the problems, the present invention provides a writing device for performing writing with respect to color electronic paper which includes a microcapsule layer having microcapsules, whose colors change depending upon a direction of an electric field, arranged therein in a planar shape, the microcapsule layer consisting of three types of microcapsules which are formed so as to be capable of displaying one color among three predetermined primary colors, respectively, the writing device for color electronic paper comprising: a writing head which has pixel electrodes and a counter electrode, which are arranged to be opposed to each other across the microcapsule layer, and performs electric field formation for each of the pixel electrodes with respect to the microcapsule layer according to image data; a color arrangement detector which detects an arrangement of the three types of microcapsules in the microcapsule layer; and an electric field controller which controls the electric field formation for each of the pixel electrodes on the basis of a result of the color arrangement detection by the color arrangement detector. This device is referred to as a first writing device of the present invention.

According to the first writing device of the present invention, the color arrangement detector detects how the three types of microcapsules are arranged in the microcapsule layer of the color electronic paper, and an electric field to be applied to the respective pixel electrodes is controlled by the electric field controller on the basis of a result of the color arrangement detection. Thus, writing of image data according to a color arrangement of color electronic paper to be used can be performed. Therefore, even electronic paper, in which a color arrangement of a microcapsule layer is random, is capable of performing color display corresponding to a writing signal.

Examples of a form of the first writing device of the present invention include a constitution in which the color arrangement detector includes a photodetector which detects reflected light from the microcapsules of the electronic paper via the writing head, and members of the writing head (pixel electrodes and a substrate thereof or a common electrode and a substrate thereof), which are arranged further on the photodetector side than the electronic paper, are formed as optically transparent members capable of transmitting the reflected light. In this constitution, the color arrangement detector preferably includes a light-irradiating device which irradiates light of at least two colors among the three primary colors individually on the microcapsules of the electronic paper.

Since the color arrangement detector includes the photodetector and the above-mentioned members are made optically transparent, an arrangement state of the microcapsule is directly detected via the writing head. Thus, positional accuracy of color arrangement detection is improved.

Since the color arrangement detector includes the light-irradiating device, it can detect a color arrangement without using a color filter. Thus, a structure of the photodetector can be simplified as compared to the case in which a white color light-irradiating device is provided.

The present invention also provides a writing device for color electronic paper which applies a voltage to color electronic paper with respective pixels formed of a plurality of encapsulating regions, which encapsulate charged particles or dispersion media colored in any one of a plurality of predetermined colors, and displays the color of the charged particles or dispersion media, which are encapsulated in the plurality of encapsulating regions, on a display surface, the writing device for color electronic paper comprising: a first voltage applicator which applies a voltage to a predetermined region of the color electronic paper such that all the encapsulating regions in the predetermined region come into a color developed state; a color detector which detects which color of the plurality of colors is a color displayed on the display surface of the predetermined region when the voltage is applied by the first voltage applicator; and second voltage applicator which applies a voltage to the predetermined region so as to control the color developed state of the respective encapsulating regions in the predetermined region on the basis of colors of respective pixels forming a display image, which is displayed in the predetermined region, and a result of detection of the color detector. This device is referred to as a second writing device of the present invention.

In the second writing device of the present invention, examples of the plurality of predetermined colors include three primary colors for printing such as cyan, magenta, and yellow, and three primary colors of light such as red, green, and blue. In addition, examples of the encapsulating region include a region which is formed in a microcapsule, and a region which is formed by partition walls. Moreover, examples of the color developed state include a state in which a color of the charged particles or dispersion media colored in the plurality of predetermined colors can be visually recognized from the display surface side.

Further, in the second writing device of the present invention, the first voltage applicator, the color detector, and the second voltage applicator may be arranged in this order.

Moreover, the second writing device of the present invention may be a writing device for color electronic paper in which a plurality of stripe regions are formed of a plurality of encapsulating regions which encapsulate common colored charged particles or dispersion media of a plurality of colors, the writing device for color electronic paper wherein the first voltage applicator, the color detector, and the second voltage applicator are arranged so as to be along a direction perpendicular to a longitudinal direction of the stripe regions.

Furthermore, the second writing device of the present invention may be a writing device for color electronic paper in which a plurality of stripe regions are formed of a plurality of encapsulating regions which encapsulate common colored charged particles or dispersion media of any of a plurality of predetermined colors, wherein the first voltage applicator, the color detector, and the second voltage applicator are arranged so as to be along a longitudinal direction of the stripe regions.

The present invention also provides a writing method for color electronic paper which applies a voltage to color electronic paper with respective pixels formed of a plurality of encapsulating regions, which encapsulate charged particles or dispersion media colored in any one of a plurality of predetermined colors, and displays the color of the charged particles or dispersion media, which are encapsulated in the plurality of encapsulating regions, on a display surface, the writing method for color electronic paper comprising: applying a voltage to a predetermined region of the color electronic paper such that all the encapsulating regions in the predetermined region come into a color developed state; detecting which color of the plurality of colors is displayed on the display surface of the predetermined region when the voltage is applied; and applying a voltage to the predetermined region so as to control the color developed state of the respective encapsulating regions in the predetermined region on the basis of a result of the detection and colors of respective pixels forming a display image, which is displayed in the predetermined region.

BRIEF DESCRIPTION OF THE DRAWINGS

FIG. 6(*b*) is a sectional view illustrating details of a head main portion of the writing device in FIG. 1.

FIG. 9(*b*) is a diagram showing an example of the color arrangement state of the microcapsule layer.

FIG. 10(*b*) is a diagram showing an example of the color arrangement state of the microcapsule layer.

DETAILED DESCRIPTION

Embodiments of the present invention will be hereinafter described.

First Embodiment

Embodiment of the First Writing Device of the Present Invention

Figure 1:
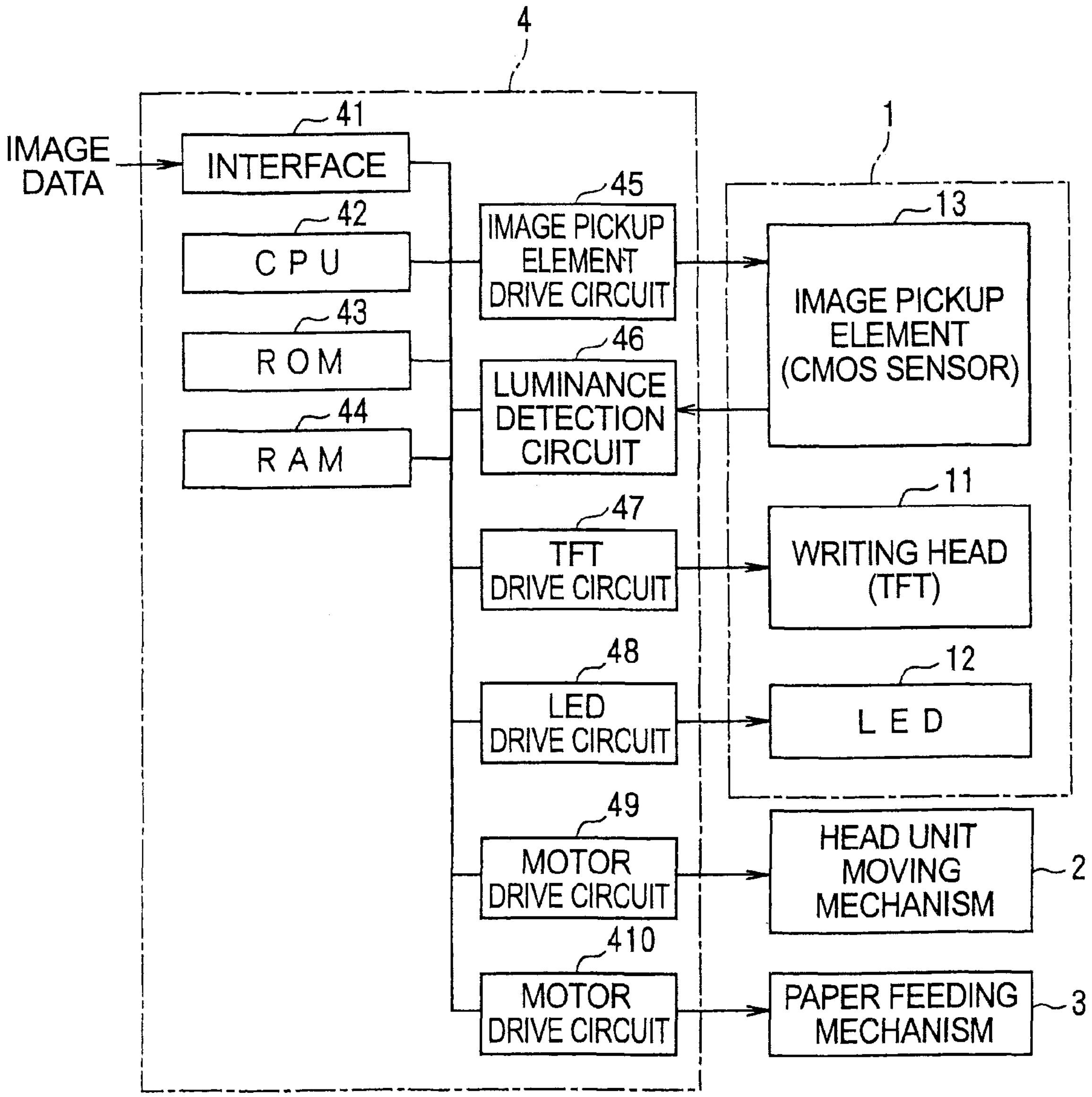
FIG. 1 is a block diagram showing a structure of a writing device of a first embodiment.
Figure 2:
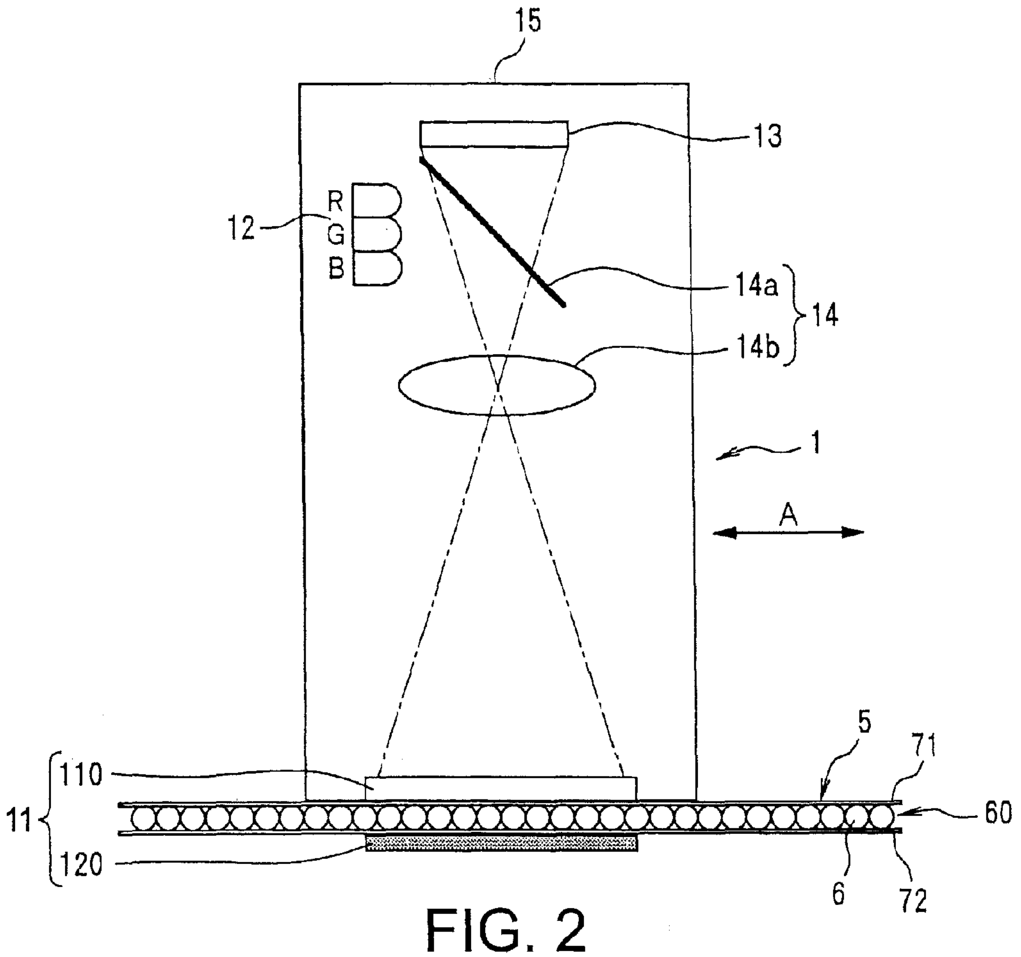
FIG. 2 is a schematic diagram showing a head unit of the writing device in FIG. 1.
Figure 3:
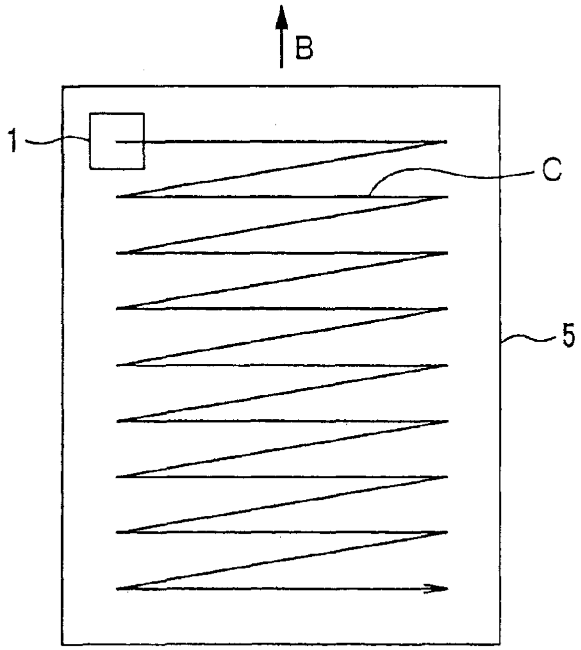
FIG. 3 is a plan view showing a moving locus of the writing device of FIG. 1 with respect to electronic paper.

FIG. 1 is a block diagram showing a structure of a writing device of this embodiment. FIG. 2 is a schematic diagram showing a head unit. FIG. 3 is a plan view showing a moving locus of the writing device of this embodiment with respect to electronic paper.

As shown in FIG. 1, the writing device of this embodiment includes a head unit 1, a head unit moving mechanism 2 which moves the head unit 1 in a direction A in FIG. 2, a paper feeding mechanism 3 which moves electronic paper 5 in a direction B in FIG. 3, and a controller 4. The head unit 1 is moved on a locus C shown in FIG. 3 relative to the electronic paper (color display medium) 5 by the head unit moving mechanism 2 and the paper feeding mechanism 3.

The head unit 1 includes a writing head 11, an LED 12 which emits light of three primary colors of R, G and B, an image sensing element 13 consisting of a CMOS sensor, and an optical system 14 which is provided with a half mirror 14*a* and a lens 14*b*. These components are set in a light blocking housing 15.

The writing head 11 includes an optically transparent head main portion 110 provided with pixel electrodes and a common electrode (counter electrode) 120. This head main portion 110 is equivalent to a member of the writing head 11 which is arranged further on a photodetector side than the electronic paper 5. An opening is formed on a lower surface of the housing 15, and the plate-like head main portion 110 is arranged in this opening. The common electrode 120 is attached to a lower part of the housing 15 such that an interval between the common electrode 120 and the head main portion 110 takes a value associated with a thickness of the electronic paper 5.

The image sensing element 13 is arranged two-dimensionally at an upper end in the housing 15 so as to be opposed to the head main portion 110. The half mirror 14*a* and the lens 14*b* are arranged between the image sensing element 13 and the head main portion 110. The LED 12 is arranged beside the half mirror 14*a* and is constituted such that light from the LED 12 is directed to the head main portion 110 with an optical axis thereof bent by the half mirror 14*a*. Consequently, the light from the LED 12 is irradiated on the electronic paper 5, which is arranged between the head main portion 110 and the common electrode 120, via the head main portion 110, and reflected light from the electronic paper 5 is inputted to the image sensing element 13 via the head main portion 110.

The electronic paper 5 includes a microcapsule layer 60 and substrates 71 and 72 arranged on both sides of the microcapsule layer 60 as shown in a sectional view in FIG. 2. In the microcapsule layer 60, microcapsules 6 whose color changes depending upon a direction of an electric field are arranged in a planar shape and are fixed by an optically transparent binder. In addition, one substrate 71 is optically transparent. The electronic paper 5 is used facing this optically transparent substrate 71 side to the head main portion 110. The optically transparent substrate 71 side of the electronic paper 5 is a display surface (observation surface) thereof.

Figure 4:
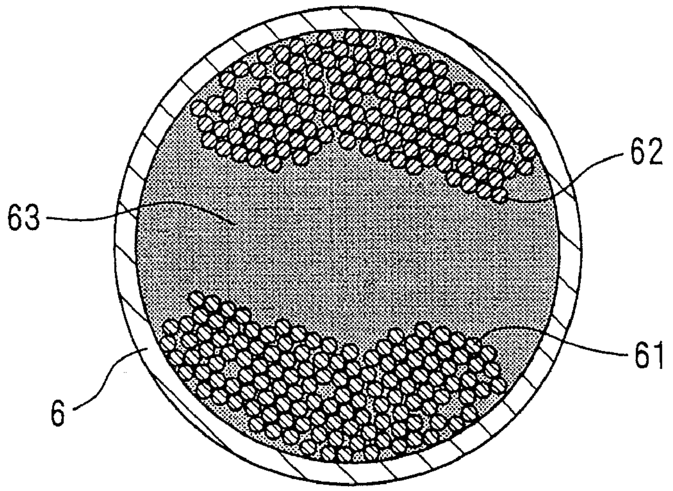
FIG. 4 is a sectional view showing the inside of a microcapsule.

As shown in FIG. 4, in the microcapsule 6, pigment particles 61 of a color of three primary colors consisting of cyan (C), magenta (M), and yellow (Y), pigment particles 62 of white which is a non-display color, and diffusion media 63 of these particles are contained. These pigment particles 61 and 62 are charged in polarities different from each other but are adjusted so as not to attract each other.

Therefore, the electronic paper 5 including the microcapsules 6 is arranged in the writing head 11 to apply an electric field between the pixel electrodes 112 and the common electrode 120, whereby one of the pigment particles 61 of three primary colors and the pigment particles 62 of white are arranged on the optically transparent substrate 71 side (pixel electrodes 112 side) in the microcapsules 6 and the other particles are arranged on the other substrate 72 side. Consequently, the pigment particles 61 of three primary colors are arranged on the optically transparent substrate 71 side, and color display according to image data becomes possible.

Figure 5:
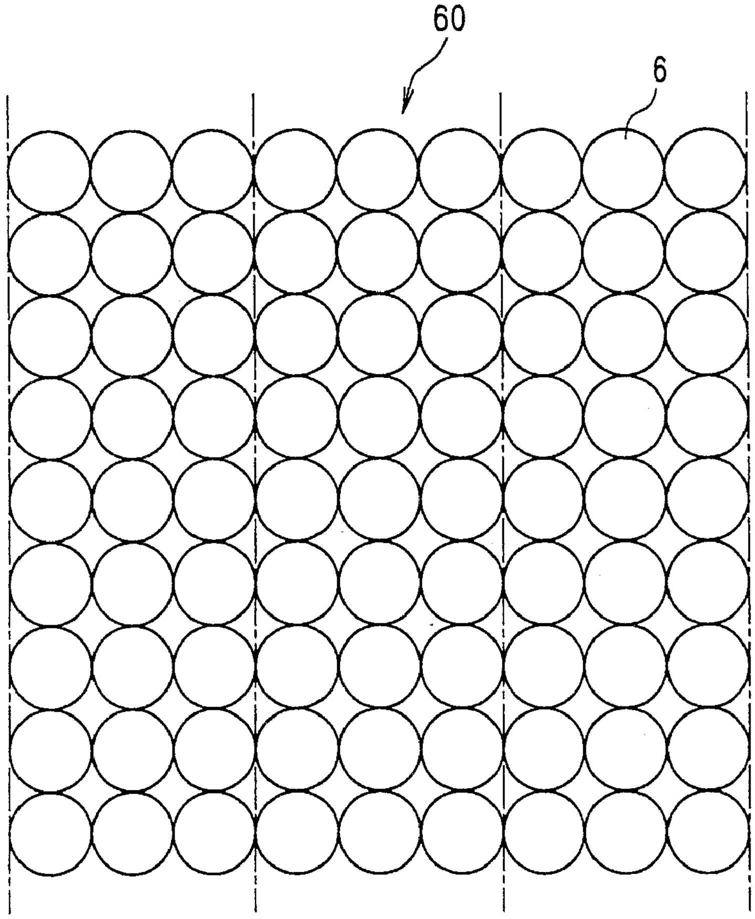
FIG. 5 is a plan view showing an arrangement state of microcapsules in the electronic paper.

As shown in FIG. 5, in the electronic paper 5 used in this embodiment, the microcapsule layer 60 in which the microcapsules 6 are arranged orderly in a grid pattern is formed, and a color arrangement is made unclear.

Figure 6A:
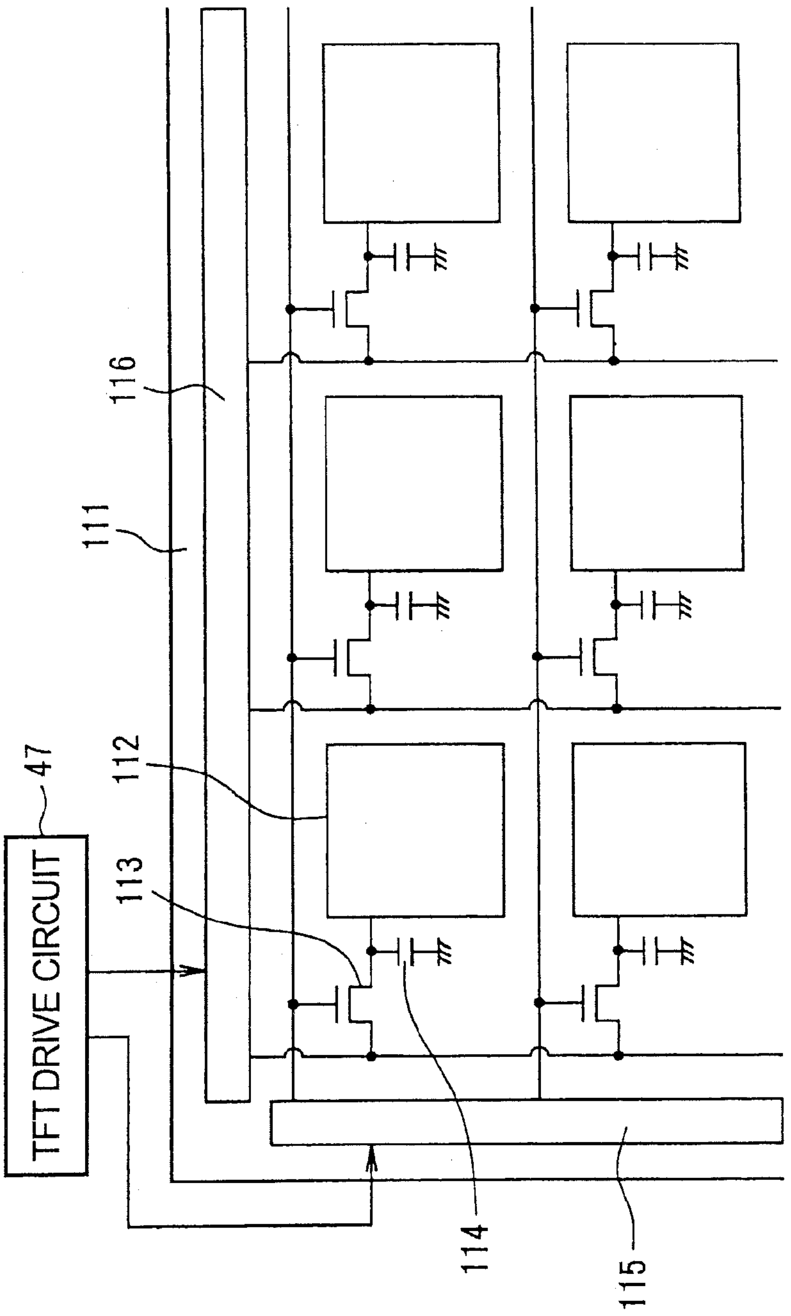
FIG. 6(*a*) is a plan view illustrating details of a head main portion of the writing device in FIG. 1.
Figure 6B:
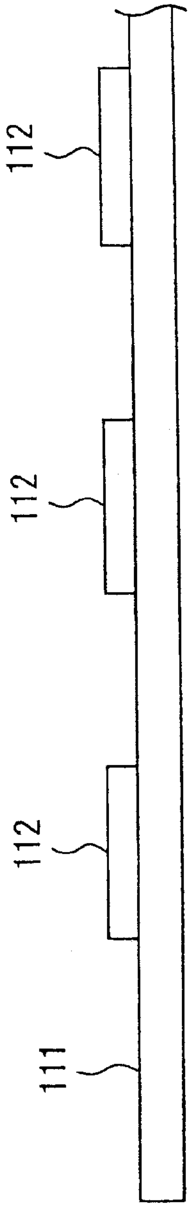

Next, details of the head main portion 110 will be described with reference to FIG. 6. The head main portion 110 includes an optically transparent (transparent) substrate 111, the transparent pixel electrodes 112 which are arranged in a matrix on this substrate 111, a TFT (thin film transistor) 113 and a capacitor 114 which are arranged for each of the pixel electrodes 112, a gate driver 115 which applies a voltage to gates of the respective transistors, and a source driver 116 which applies a voltage to sources of the respective transistors.

The gate driver 115 and the source driver 116 drive the gates and the sources according to a signal from a TFT drive circuit 47 of the controller 4. The gate driver 115 and the source driver 116 bring the TFT 113 for each of the pixel electrodes into an "ON" or "OFF" state through the drive of the gates and the sources and, at the same time, apply an electric field of a magnitude and a direction according to image data between the respective pixel electrodes 14 and the common electrode 13.

Here, a voltage V of the common electrode 120 is set to a value "0.5 $V_1$" in the middle of a highest value (a maximum voltage $V_1$ at the time when the gates of the TFTs 113 are "ON") and a lowest value (voltage $V_0$=0 at the time when the gates of the TFTs 113 are "OFF") of a voltage of the pixel electrodes 112. Consequently, for each of the pixel electrodes 112, a direction of an electric field applied to the microcapsules 6 existing between the pixel electrode 112 and the common electrode 120 changes according to "ON" and "OFF" of the TFT 113.

In addition, in the microcapsule 6 to be used, it is assumed that the pigment particles of three primary colors (three primary color particles) 61 are charged negatively and the pigment particles of white (white particles) 62 are charged positively. Thus, when the TFTs 113 are turned "ON" and an electric field directed toward the common electrode 120 from the pixel electrodes 112 is generated, the microcapsules 6 existing in this electric field change to a color display state as the three primary color particles 61 inside thereof move to the pixel electrodes 120 side. When the TFTs 113 are turned "OFF" and an electric field directed toward the pixel electrodes 112 from the common electrode 120 is generated, the microcapsules 6 existing in this electric field change to a color non-display state (white display state) as the white particles 62 inside thereof move to the pixel electrodes 120 side.

As shown in FIG. 1, the controller 4 includes an interface 41, a CPU 42, a ROM 43, a RAM 44, an image sensing element drive circuit 45, a luminance detection circuit 46, a TFT drive circuit 47, an LED drive circuit 48, a motor drive circuit 49 for the head unit moving mechanism 2, and a motor drive circuit 401 for the paper feeding mechanism 3. The controller 4 is constituted such that the arithmetic operation processing shown in flowcharts of FIGS. 7 and 8 is performed.

Figure 7:
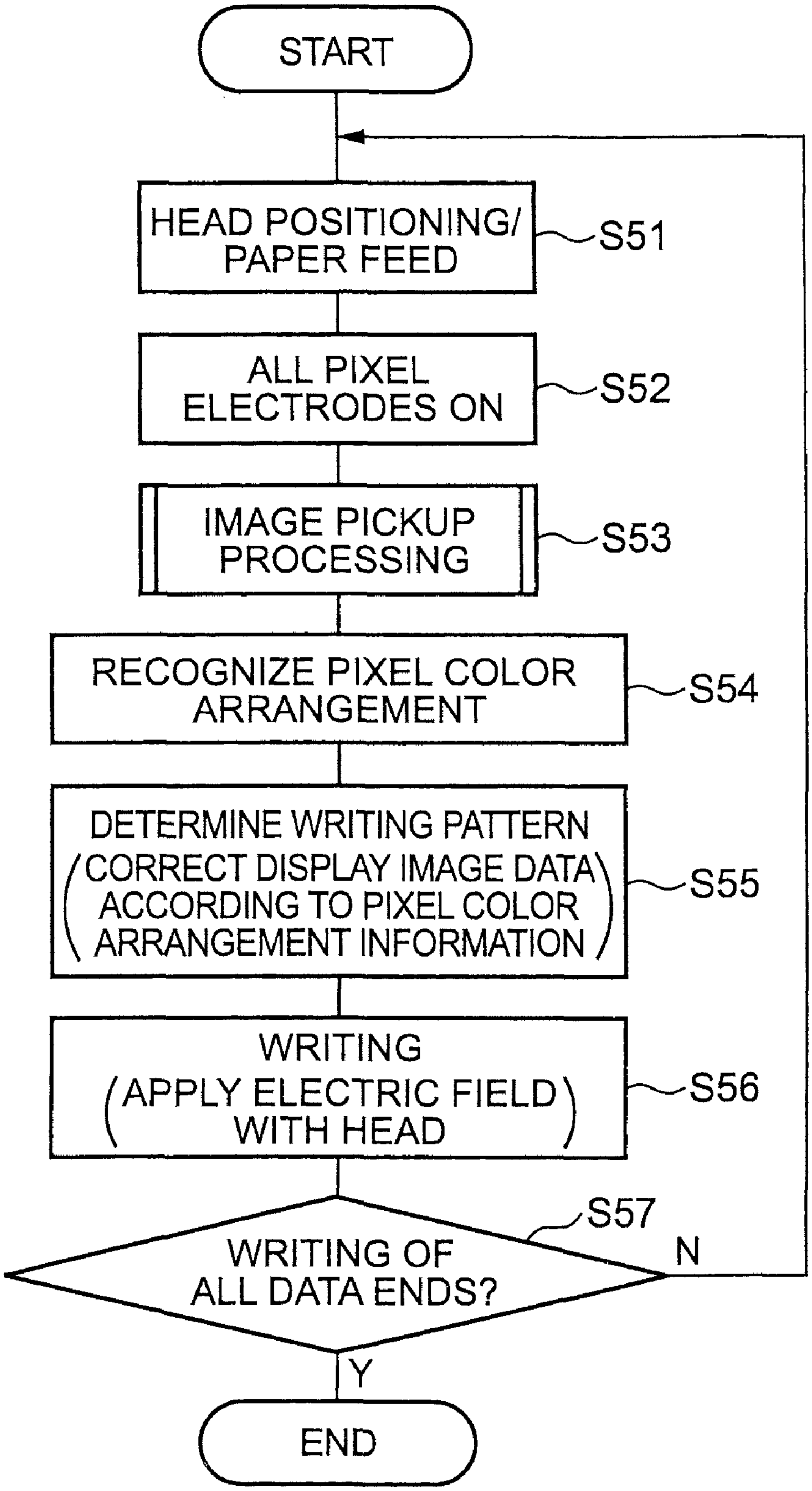
FIG. 7 is a flowchart showing an arithmetic operation process which is performed by a controller of the writing device in FIG. 1.

In the arithmetic operation processing shown in the flowchart of FIG. 7, in step S51, the controller 4 outputs a drive signal to the drive circuit 49 of the head unit moving mechanism 2 and/or the drive circuit 410 of the paper feeding mechanism 3 to thereby drive the head moving mechanism 2 and/or the paper feeding mechanism 3 and insert a region of the electronic paper 5 between the head main portion 110 of the writing head 11 and the common electrode 120 such that the head unit 1 is arranged in a predetermined position with respect to the electronic paper 5.

Next, the controller 4 shifts to step S52 and causes the TFT drive circuit 47 to output a signal for turning "ON" the TFTs of all the pixel electrodes 112 such that the three primary color particles 61 are arranged on the head main portion 110 side and the white particles 62 are arranged on the common electrode 120 side in all the microcapsules 6 of the electronic paper 5. Consequently, all the microcapsules 6 in the writing head 11 come into a color display state of any one of the colors C (cyan), M (magenta) and Y (yellow).

Figure 8:
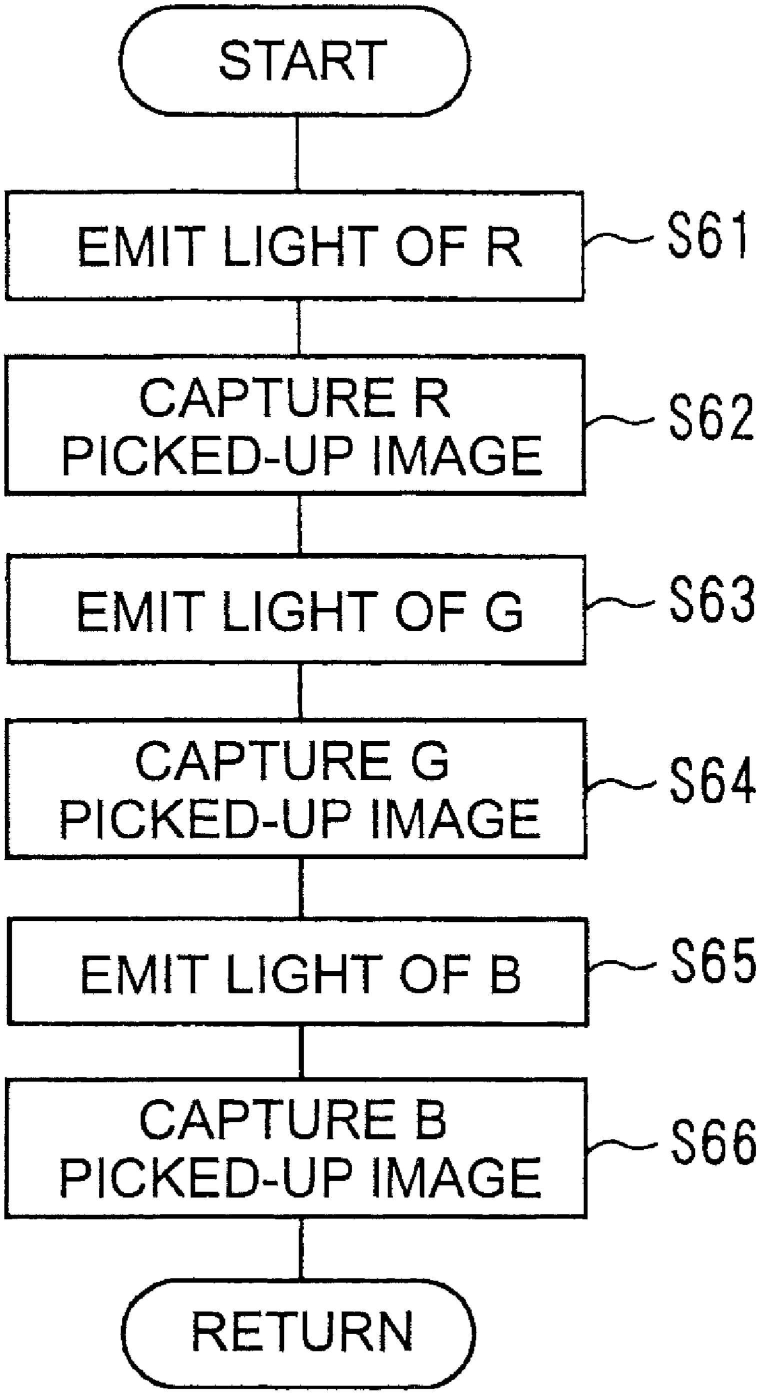
FIG. 8 is a flowchart showing an arithmetic operation process which is performed by the controller of the writing device of FIG. 1.

Next, the controller 4 shifts to step S53 and performs the arithmetic operation processing shown in the flowchart of FIG. 8. In step S61 of FIG. 8, the controller 4 inputs a signal for emitting light of R (red) to the LED drive circuit 48 to cause it to emit light of R of the LED 12. Next, the controller 4 shifts to step S62 and inputs a drive signal to the image sensing element drive circuit 45 to pick up an image.

Next, the controller 4 shifts to step S63 and inputs a signal for emitting light of G (green) to the LED drive circuit 48 to cause it to emit light of G of the LED 12. Next, the controller 4 shifts to step S64 and inputs a drive signal to the image sensing element drive circuit 45 to pick up an image. Next, the controller 4 shifts to step S65 and inputs a signal for emitting light of B to the LED drive circuit 48 to cause it to emit light of B (blue) of the LED 12. Next, the controller 4 shifts to step S66 and inputs a drive signal to the image sensing element drive circuit 45 to pick up an image.

Next, the controller 4 shifts to step S54 of FIG. 7 and detects a color arrangement of the microcapsule layer 60 from a result of image pickup in step S53. In other words, since a part of the microcapsule layer 60 where the color C is displayed becomes dark due to the irradiation of the light of R, a position of the microcapsule 6 of the color C is detected from a result of image pickup in step S62. In addition, since a part of the microcapsule layer 60 where the color M is displayed becomes dark due to the irradiation of the light of G, a position of the microcapsule 6 of the color M is detected from a result of image pickup in step S64. Further, a part of the microcapsule layer 60 where the color Y is displayed becomes dark due to the irradiation of the light of B, a position of the microcapsule 6 of the color Y is detected from a result of image pickup in step S66.

Next, the controller 4 shifts to step S55 and determines a signal to be outputted to the TFT drive circuit 47 such that color display according to image data inputted to the interface 41 is performed on the basis of information on the color arrangement detected in step S54. Next, the controller 4 shifts to step S56 and outputs the signal to the TFT drive circuit 47 to cause the TFT drive circuit 47 of the writing head 11 to drive and turn "ON" or "OFF" the TFTs 113 of the respective pixel electrodes 112 and bring the microcapsules 6 corresponding to the respective pixel electrodes into a color display state or a color non-display state according to a direction of an electric field.

Next, the controller 4 shifts to step S57 and judges whether or not writing of all image data has ended. If the writing has not ended, the controller 4 returns to step S51 and moves the head unit 1 such that the next region of the electronic paper 5 enters the writing head 11, and repeats steps S51 to S57 until writing of all image data ends.

In other words, first, the controller 4 inserts an initial region of the electronic paper 5 between the common electrode 120 and the head main portion 110 of the writing head 11 according to driving of the paper feeding mechanism 3. Next, in a state in which the paper feeding mechanism 3 is stopped, the controller 4 performs writing with respect to the electronic paper 5 from one end to the other end in a width direction of the electronic paper 5 while moving the head unit 1 in one side of the direction A (to the right in FIG. 3) with the head unit moving mechanism 2. Next, the controller 4 moves the head unit 1 in the other side in the direction A (to the left in FIG. 3) and moves the electronic paper 5 a predetermined distance in the direction B with the paper feeding mechanism 3 to stop it, and then performs writing of the next row. The controller 4 repeats this process to thereby perform writing with respect to the entire surface of the electronic paper 5.

In the writing device of this embodiment, the color arrangement detection means of the present invention includes the LED (light irradiation device) 12, the image sensing element (photodetector) 13, the optical system (light irradiation device) 14, the image sensing element drive circuit 45, the luminance detection circuit (photodetector) 46, the LED drive circuit 48, programs for executing the flowchart (steps S52 to S54) of FIG. 7 and the flowchart of FIG. 8, the ROM 43 having this program stored therein, the CPU 42 which performs arithmetic operation processing in accordance with this program, and the RAM 44 which is used in performing the arithmetic operation processing.

In the writing device in this embodiment, the electric field controller of the present invention includes a TFT drive circuit 47, a program for executing the flowchart (step S55) of FIG. 7, the ROM 43 having this program stored therein, the CPU 42 which performs arithmetic operation processing in accordance with this program, and the RAM 44 which is used in performing the arithmetic operation processing.

According to the writing device of this embodiment, a color arrangement of the microcapsule layer 60 of the color electronic paper 5 is detected, an electric field applied to the respective pixel electrodes 112 of the writing head 11 is controlled on the basis of a detected value of the color arrangement, and writing of image data according to the detected value of the color arrangement is performed. Thus, writing of image data according to the color arrangement of the color electronic paper 5 to be used can be performed. Therefore, even the electronic paper 5, in which a color arrangement of the microcapsule layer 60 is random, is able to perform color display according to a writing signal.

Figure 9A:
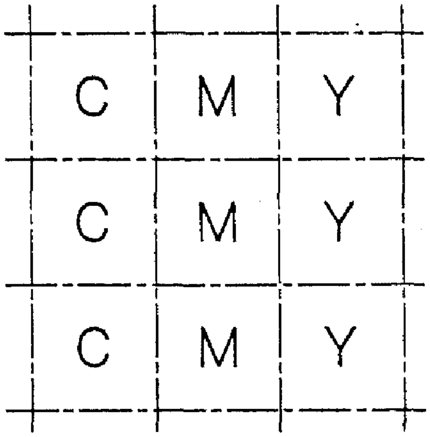
FIG. 9(*a*) is a diagram showing an example of a color arrangement state of a microcapsule layer.
Figure 9B:
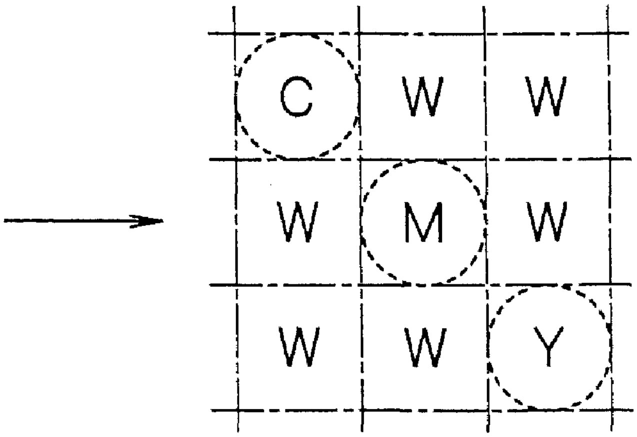

For example, in the case in which one dot of color is represented using three microcapsules arranged sideways, if a detected value of a color arrangement is "CMY" from the left in all the microcapsules for the three dots as shown in FIG. 9(*a*), when image data for displaying colors of "CMY" from the top is inputted, TFTs of pixel electrodes corresponding to microcapsules on the left at the top, in the middle under the top, and the right in the bottom are turned "ON", and colors of "CMY" are displayed from the top as shown in FIG. 9(*b*).

Figure 10A:
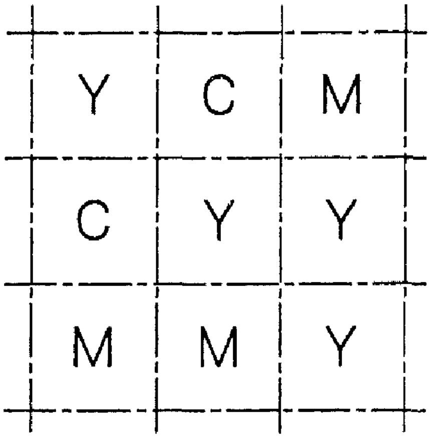
FIG. 10(*a*) is a diagram showing an example of the color arrangement state of the microcapsule layer.
Figure 10B:
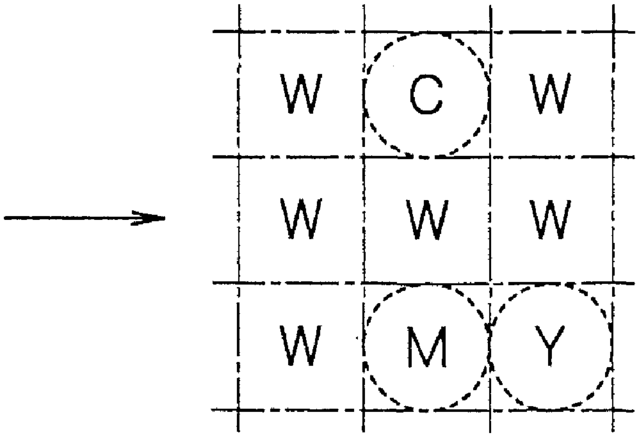

For example, as shown in FIG. 10(*a*), if a color arrangement of three microcapsules for respective dots is "YCM", "CYY", and "MMY" from the top, the second dot cannot be displayed as "M".

In this case, when image data for displayed colors of "CMY" from the top is inputted, as shown in FIG. 10(*b*), a TFT of a pixel electrode corresponding to a microcapsule at the top in the middle and TFTs of pixel electrodes corresponding to microcapsules in the bottom in the middle and the right are turned "ON". In other words, in this case, colors are not displayed as "CMY" from the top in the strict sense. However, both the colors of "M" and "Y" are displayed by the microcapsules for the bottom dot, whereby an approximate color representation can be performed.

Figure 11:
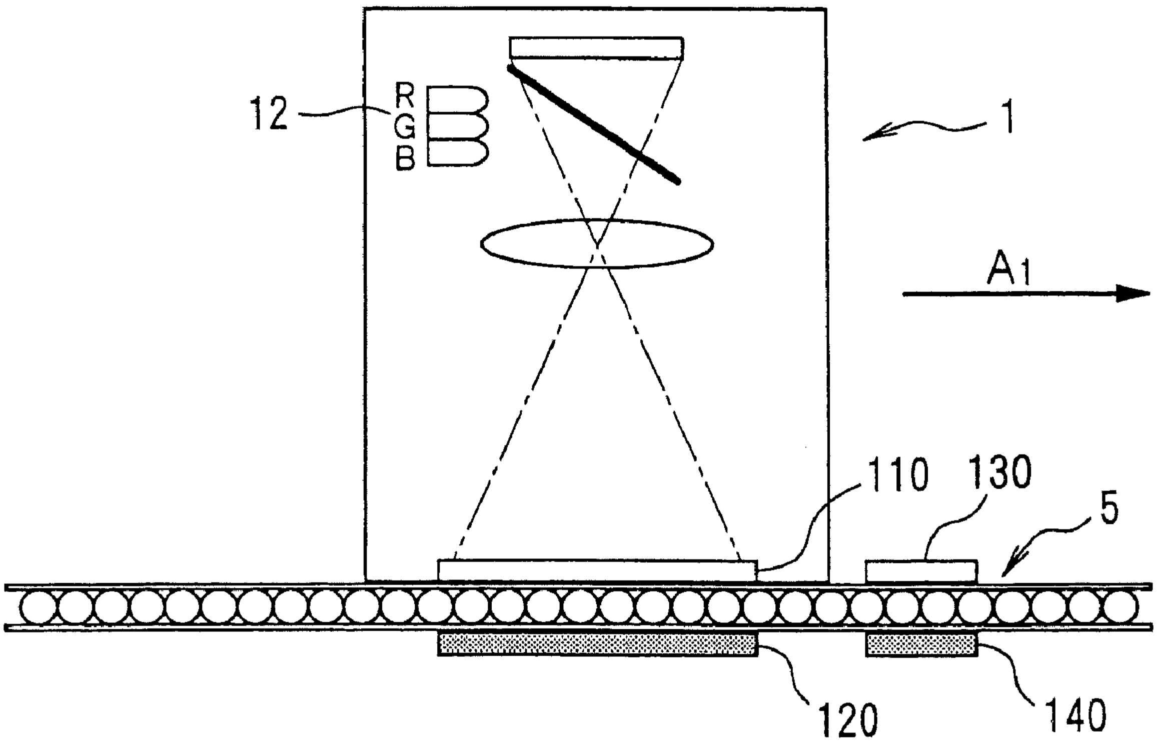
FIG. 11 is a diagram showing an example in which an entire display head is located outside a head unit.

Note that, in the writing device of this embodiment, in order to detect a color arrangement of the electronic paper 5, all the pixel electrodes of the head main portion 110 are turned "ON" in step S52 of the flowchart of FIG. 7 to bring all the microcapsules 6 in the writing head 11 into a color display state. However, instead of this, as shown in FIG. 11, an entire display head provided with a pair of electrodes 130 and 140 may be provided outside the head unit 1.

This entire display head is arranged in a traveling direction of the heat unit 1 at the time of writing. The electronic paper 5 enters the writing head 11 of the head unit 1 after the microcapsules 6 are brought into an entire display state by this entire display head. In this case, step S52 is unnecessary.

In addition, in the writing device of this embodiment, light of the three primary colors of R, G and B is irradiated individually to detect the respective colors of C, M and Y. However, it is also possible to individually irradiate light of two of the three primary colors to detect two colors of C, M and Y, and then judge that a part not corresponding to the two colors is a part of the other color to thereby detect the three colors. Further, it is also possible to arrange an irradiation device for irradiating white light instead of the light irradiation device for individually irradiating light of the three primary colors and perform color separation or the like on the photodetector side through use of a color image sensing element or the like.

Second Embodiment

Embodiment of the Second Writing Device of the Present Invention

Figure 12:
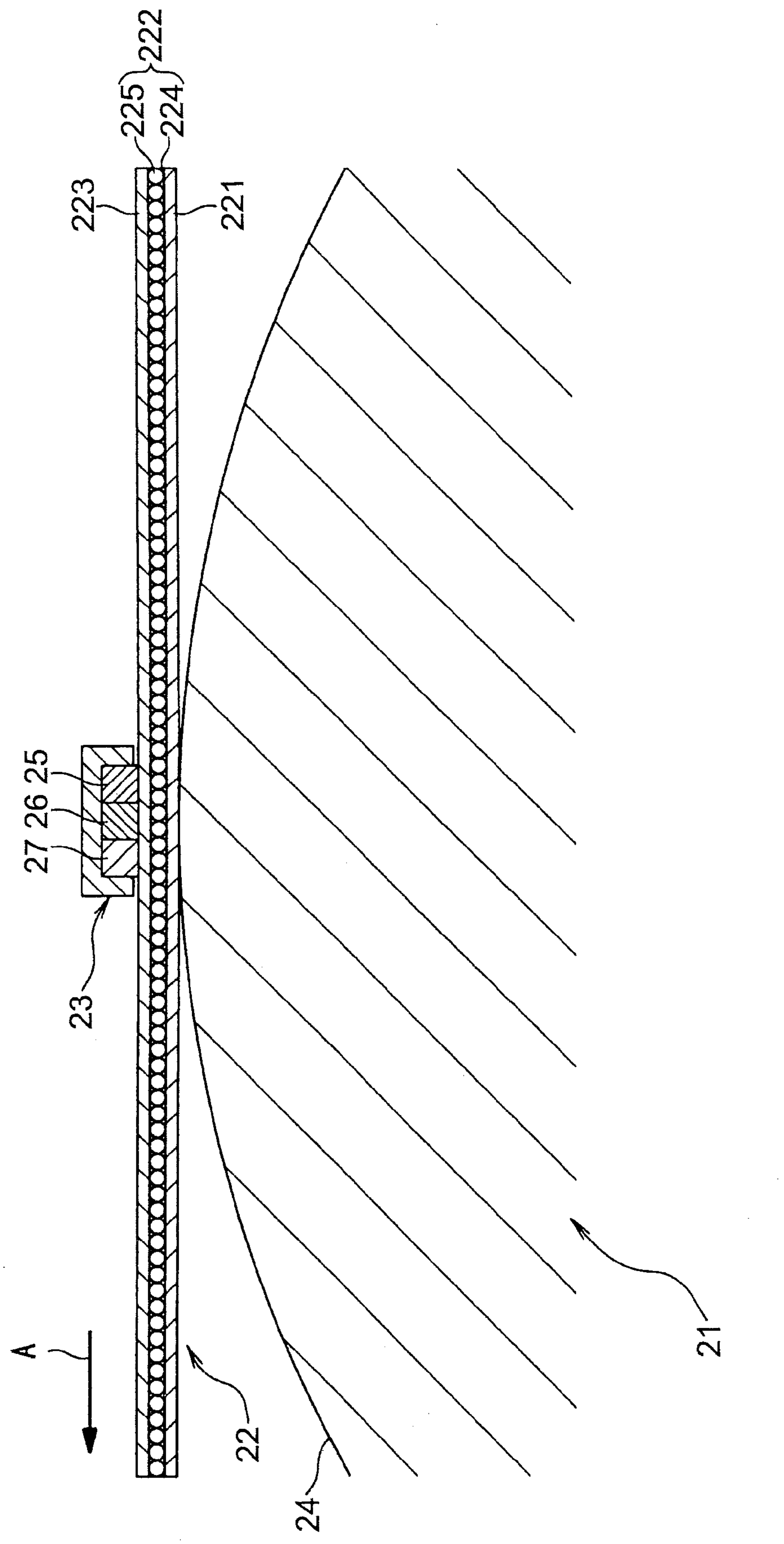
FIG. 12 is a side view showing a writing device (a rewriting device for color electronic paper) of a second embodiment.

FIG. 12 is a side view showing an embodiment of the writing device for color electronic paper (rewriting device for color electronic paper) of the present invention. A rewriting device for color electronic paper 21 shown in the figure is a device for drawing (displaying) a predetermined display pattern (display image) such as a character, a numeral, or a figure (picture) on color electronic paper 22 to be described later.

This rewriting device for color electronic paper 21 includes a line head 23 which erases a display pattern drawn on the color electronic paper 22 and draws a new display pattern, a paper feed roller 24 which conveys the color electronic paper 22, and a not-shown drive mechanism which rotates the paper feed roller 24. Note that a direction of arrow A in FIG. 12 is a conveying direction of the color electronic paper 22.

In addition, the color electronic paper 22 is a display medium utilizing electrophoresis which is capable of rewriting or erasing a display pattern. The color electronic paper 22 includes opaque paper (a sheet-like base material layer having flexibility) 221, an electronic ink layer 222 which is formed on the paper 221, and a coating layer 223 which is formed on the electronic ink layer 222. Further, a surface on the upper side of the coating layer 223 is set as a display surface on which a display pattern is displayed.

The electronic ink layer 222 includes a (transparent) binder 224 having optical transparency, and a plurality of microcapsules 225 which are uniformly dispersed and fixed in the binder 224. As the binder 224, for example, polyvinyl alcohol or the like can be used.

Figure 13:
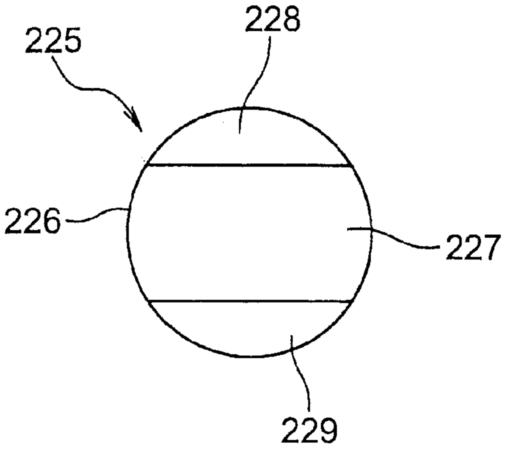
FIG. 13 is a main part enlarged view showing a microcapsule in FIG. 12 in an enlarged state.

FIG. 13 is a sectional view showing a microcapsule 225 of the electronic ink layer 222 shown in FIG. 12. The microcapsule 225 shown in FIG. 13 includes a hollow spherical capsule body 226 having optical transparency. A liquid (dispersion medium) 227 is encapsulated in the capsule body 226. A plurality of first charged particles 228, which are colored in any one of cyan (C), magenta (M), and yellow (Y), and a plurality of second charged particles 229, all of which are colored in white, are dispersed in the liquid 227. Note that it is assumed that the first charged particles 228 are charged negatively and the second charged particles 229 are charged positively.

The capsule body 226 in FIG. 13 is a film having a predetermined thickness like the microcapsule 6 in FIG. 4. In FIG. 13, reference numeral 228 denotes an aggregate of first charged particles and 229 denotes an aggregate of second charged particles.

Figure 14:
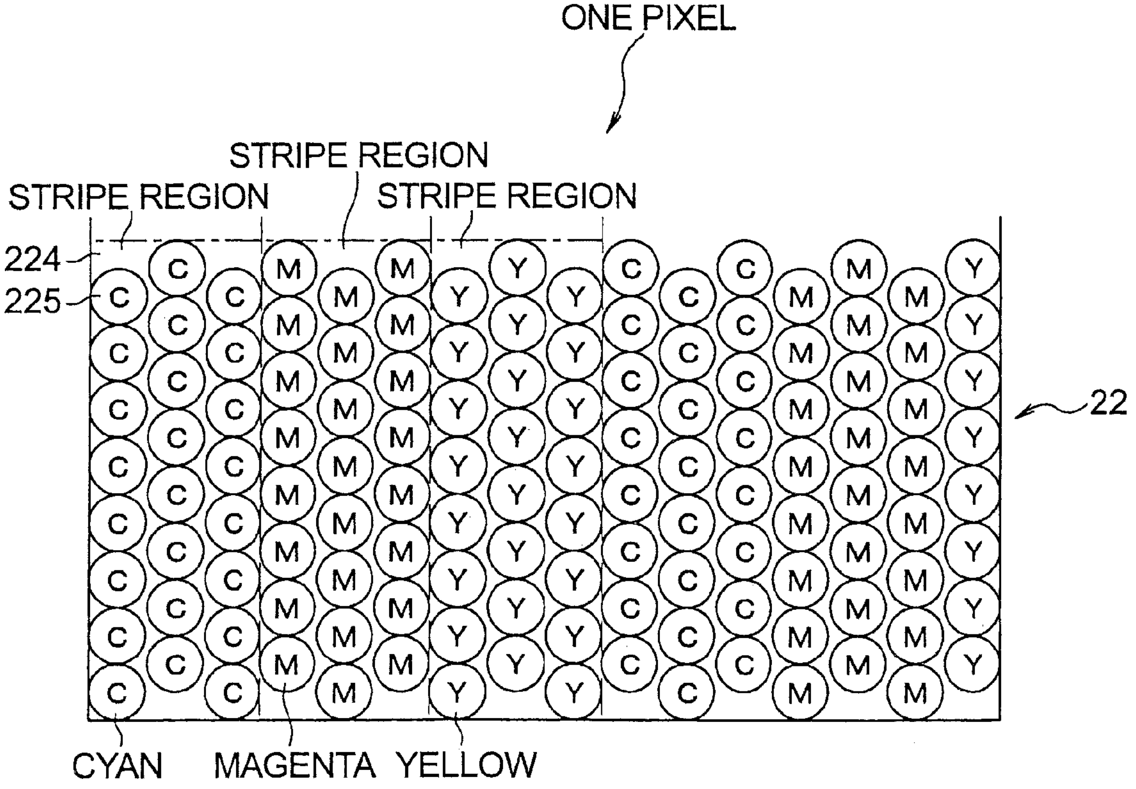
FIG. 14 is a plan view of the color electronic paper in FIG. 12.

FIG. 14 is a plan view showing an arrangement of the microcapsules 225 in the electronic ink layer 222. The microcapsules 225 shown in the figure are orderly arranged two-dimensionally in a longitudinal direction and width direction of the color electronic paper 22. In particular, the microcapsules 225 form a plurality of stripe regions constituted by arranging the microcapsules 225 encapsulating the first charged particles 228 of the same color in one row in the vertical direction and in three rows in the width direction. Three kinds of groups of the microcapsules 225 form one pixel. When an external electric field is applied to the microcapsules 225, the first charged particles 228 move in a direction opposite to a direction of the electric field in the capsule body 226.

For example, when an electrode charged positively is located on the upper side (display surface side) in FIG. 13 of the microcapsule 225, an electric field is generated toward the lower side in FIG. 13. Consequently, the first charged particles 228 move (rise) to the upper side in FIG. 13 in the capsule body 226, and the second charged particles 229 move (sink) to the lower side in FIG. 13 in the capsule body 226. Then, the upper side in FIG. 13 of the microcapsule 225 is colored in the color of the first charged particles 228, that is, any one of cyan, magenta, and yellow by the first charged particles 228.

Conversely, when a negatively charged electrode is located on the upper side in FIG. 13 of the microcapsule 225, an electric field is generated toward the upper side in FIG. 13. Consequently, the first charged particles 228 move (sink) to the lower side in FIG. 13 in the capsule body 226, and the second charged particles 229 move (rise) to the upper side in FIG. 13 in the capsule body 226. In this case, since the second charged particles 229 are located on the upper side in FIG. 13 in the capsule body 226, the upper side in FIG. 13 of the microcapsule 225 is colored in the color of the second charged particles, that is, white.

In addition, the microcapsule 225 is constituted such that a specific gravity of the liquid 227 and a specific gravity of both the charged particles 228 and 229 are equal. Consequently, even if the electric field disappears after the charged particles 228 and 229 move to the upper or the lower side in FIG. 13, both the charged particles 228 and 229 can be located in fixed positions for a long period, and the upper side in FIG. 13 of the microcapsule 225 is kept colored in the color of the first charged particles 228 or the color of the second charged particles 229. In other words, the display of the color electronic paper 22 is maintained for a long period.

Figure 15:
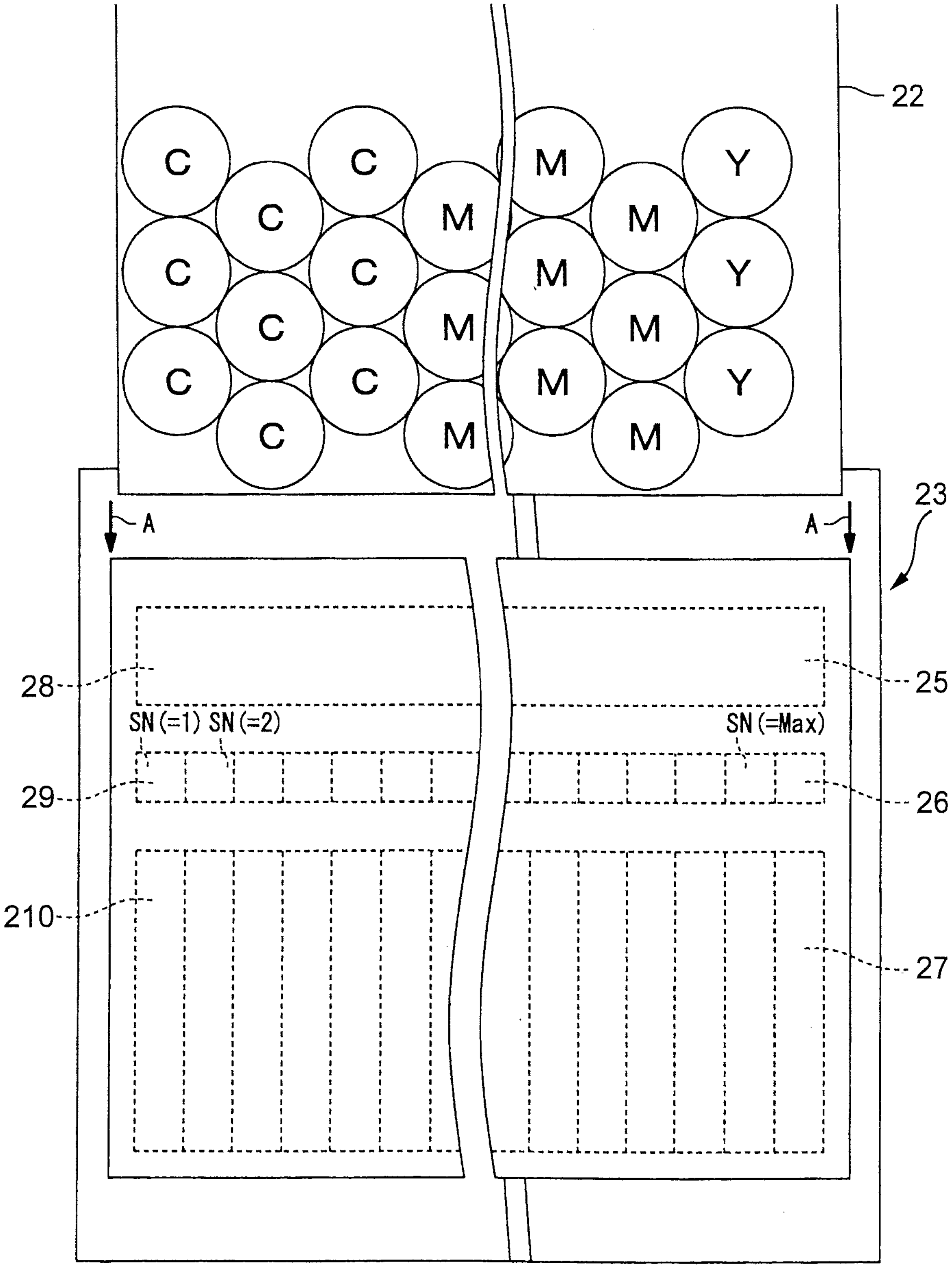
FIG. 15 is a plan view of the rewriting device for color electronic paper in FIG. 12.

On the other hand, as shown in FIG. 15, the line head 23 is set such that a longitudinal direction thereof is a direction parallel to an axis of the paper feed roller 24, that is, perpendicular to the vertical direction of the color electronic paper 22 and so as to be a predetermined distance apart from and opposed to an external circumferential surface of the paper feed roller 24. In addition, the line head 23 is arranged such that the line head 23 is on the upper side in FIG. 12, that is, on the coating layer 223 side of the color electronic paper 22, and the paper feed roller 24 is on the lower side in FIG. 12, that is, on the paper 221 side of the color electronic paper 22.

A distance between the lower surface of the line head 23 and the external circumferential surface of the paper feed roller 24 is set such that the color electronic paper 22 can pass between the line head 23 and the paper feed roller 24 and necessary and sufficient pressure and electric field can be applied to the color electronic paper 22 by the line head 23 and the paper feed roller 24.

An erase head 25, a luminance sensor array 26, and a writing head 27, which extend along the longitudinal direction of the line head 23, are arranged in the line head 23. The erase head 25, the luminance sensor array 26, and the writing head 27 are arranged side by side such that, when the color electronic paper 22 is conveyed by the paper feed roller 24 (in the direction of arrow A in FIG. 12), the color electronic paper 22 passes the erase head 25, the luminance sensor array 26, and the writing head 27 in this order.

In addition, a first pixel electrode 28, which can apply an electric field directed toward the lower side in FIG. 12 to the color electronic paper 22, is arranged in the erase head 25. A plurality of luminance sensors 29, which can irradiate light to the color electronic paper 22 to detect a luminance of reflected light, are arranged in the luminance sensor array 26. A plurality of second pixel electrodes 210, which can apply an arbitrary electric field to the color electronic paper 22, are arranged in the writing head 7. Note that the luminance sensors 29 and the second pixel electrodes 210 have the same width in the longitudinal direction of the line head 23 (e.g., ¼ or less of the width of the stripe region in FIG. 14), and are arranged in the same number in one row along the longitudinal direction of the line head 23, respectively.

In addition, the paper feed roller 24 includes a cylindrical drum body. A common electrode is set on an external circumferential surface of this drum body.

Figure 16:
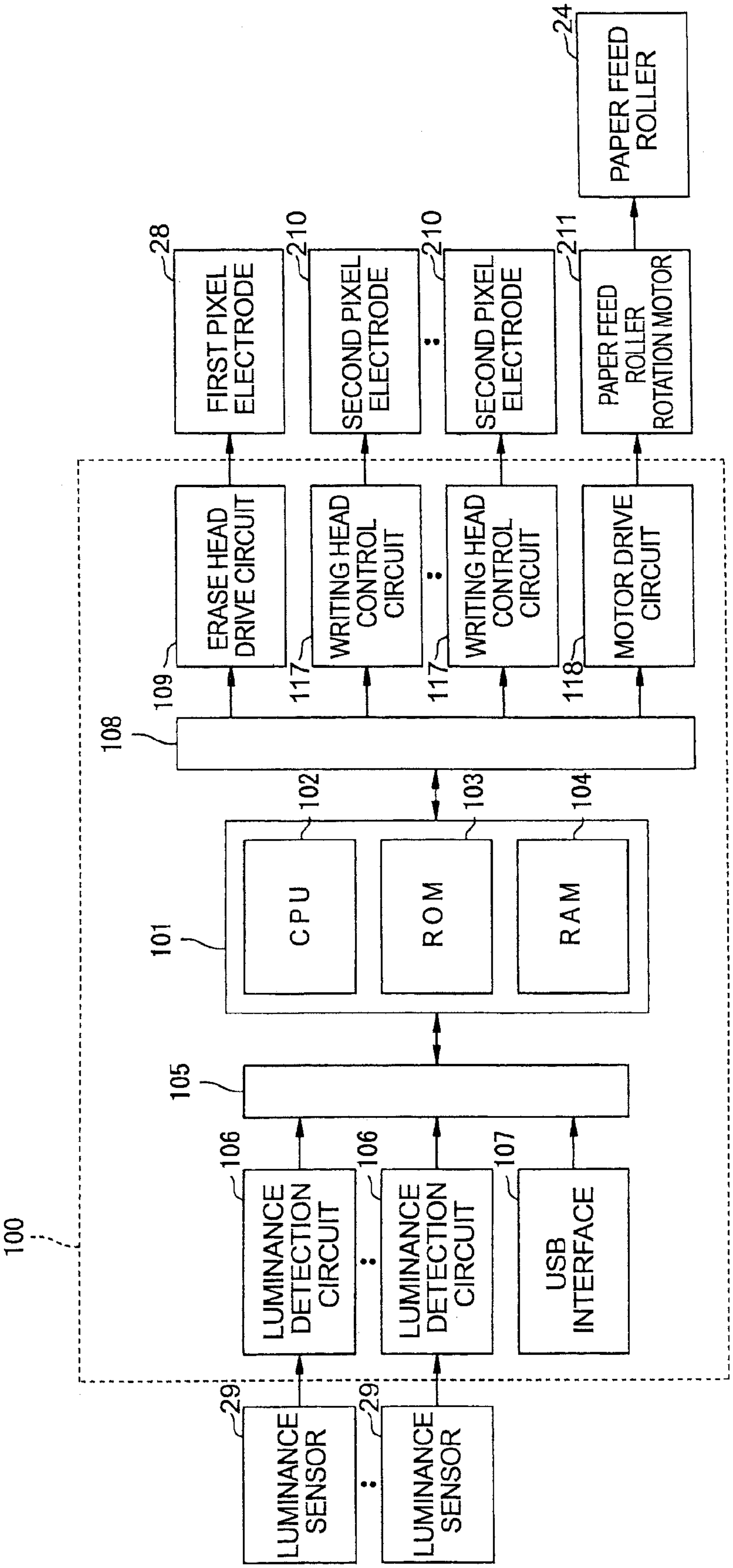
FIG. 16 is a block diagram showing a structure of a control device for the rewriting device for color electronic paper in FIG. 12.

Next, a structure of a control device 100 will be described in accordance with a block diagram of FIG. 16. In the figure, reference numeral 101 denotes a main control unit, which is mounted with a microprocessor incorporating a CPU 102 and includes a ROM 103 having stored therein a control program or the like and a RAM 104 which forms various work areas for, for example, storing data of display patterns. Examples of the data of display patterns stored in the RAM 104 include compounding ratios (half tone dot %) $C_{DN}$, $M_{DN}$, and $Y_{DN}$ or the like of cyan, magenta, and yellow contained in a display pattern to be drawn in the respective pixels of the color electronic paper 22.

In addition, a plurality of luminance detection circuits 106, which detect a luminance from reflected light detected by the luminance sensors 29, and a USB interface 107, which is connected to an external device to read data of a display pattern, are connected to an input port 105 of the main control unit 101. Further, an erase head drive circuit 109 for driving the pixel electrodes 28 of the erase head 25, a writing head control circuit 117 for driving the second pixel electrodes 210 of the writing head 7, and a motor drive circuit 118 for driving a paper feed roller rotation motor 211 for rotating the paper feed roller 24 are connected to an output port 108 of the main control unit 101. When the color electronic paper 22 is placed in the longitudinal direction between the line head 23 and the paper feed roller 24, the main control unit 101 executes the rewriting process for color electronic paper (i.e., the main control unit 101 erases a display pattern drawn on the color electronic paper 22 and draws a new display pattern).

Figure 17:
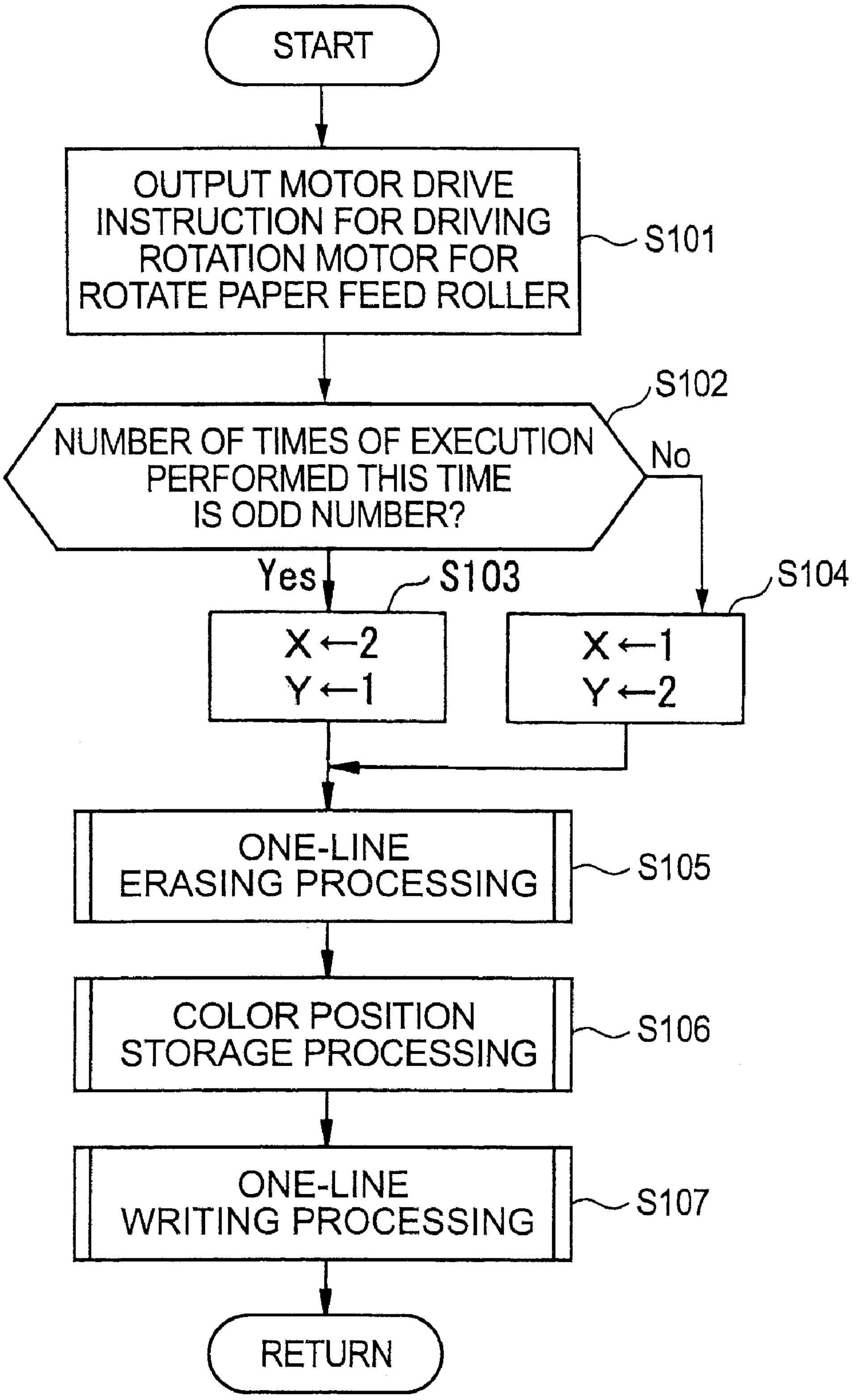
FIG. 17 is a flowchart of a rewriting process for color electronic paper in FIG. 12.

Next, the rewriting process for color electronic paper will be described in accordance with a flowchart of FIG. 17. The rewriting process for color electronic paper is processing which is executed when the color electronic paper 22 is placed in the vertical direction, that is, the longitudinal direction of a stripe region between the line head 23 and the paper feed roller 24. First, in step S101, the main control unit 101 outputs a motor drive instruction for rotating the paper feed roller rotation motor 211 to the motor drive circuit 118 such that the color electronic paper 22 moves the length of one line (e.g., a radius length of the microcapsule 225) from the erase head 25 side to the writing head 27 side.

Next, the main control unit 101 shifts to step S102 and judges whether or not the number of times of execution performed to that point of this arithmetic operation processing is an odd number. If the number of times of execution is an odd number (Yes), the main control unit 101 shifts to step S103, and if not (No), shifts to step S104.

In step S103, the main control unit 101 sets a variable X for color map storage to "2" and sets a variable Y for color map reading to "1", and then shifts to step S105.

On the other hand, in step S104, the main control unit 101 sets the variable X for color map storage to "1" and sets the variable Y for color map reading to "2", and then shifts to step S105.

In step S105, the main control unit 101 applies a voltage to the color electronic paper 22 existing between the erase head 25 and the paper feed roller 24, and executes a one-line erasing process, which is described later, for displaying a color of the first charged particles 228, which are colored in cyan, magenta, or yellow, on the display surface of the color electronic paper 22.

Next, the main control unit 101 shifts to step S106 and executes a color position storage process, which is described later, for detecting a luminance of the color electronic paper 22 existing between the luminance sensor array 26 and the paper feed roller 24, that is, a luminance of the color of the first charged particles 228 which was displayed on the display surface of the color electronic paper 22 in step S105 when this arithmetic operation process was executed last time.

Next, the main control unit 101 shifts to step S107 and executes the one-line writing process, which is described later, for applying a voltage to the color electronic paper 22 existing between the writing head 27 and the paper feed roller 24, that is, the color electronic paper 22 for which a luminance was detected in step S106 when this arithmetic operation process was executed last time.

Figure 18:
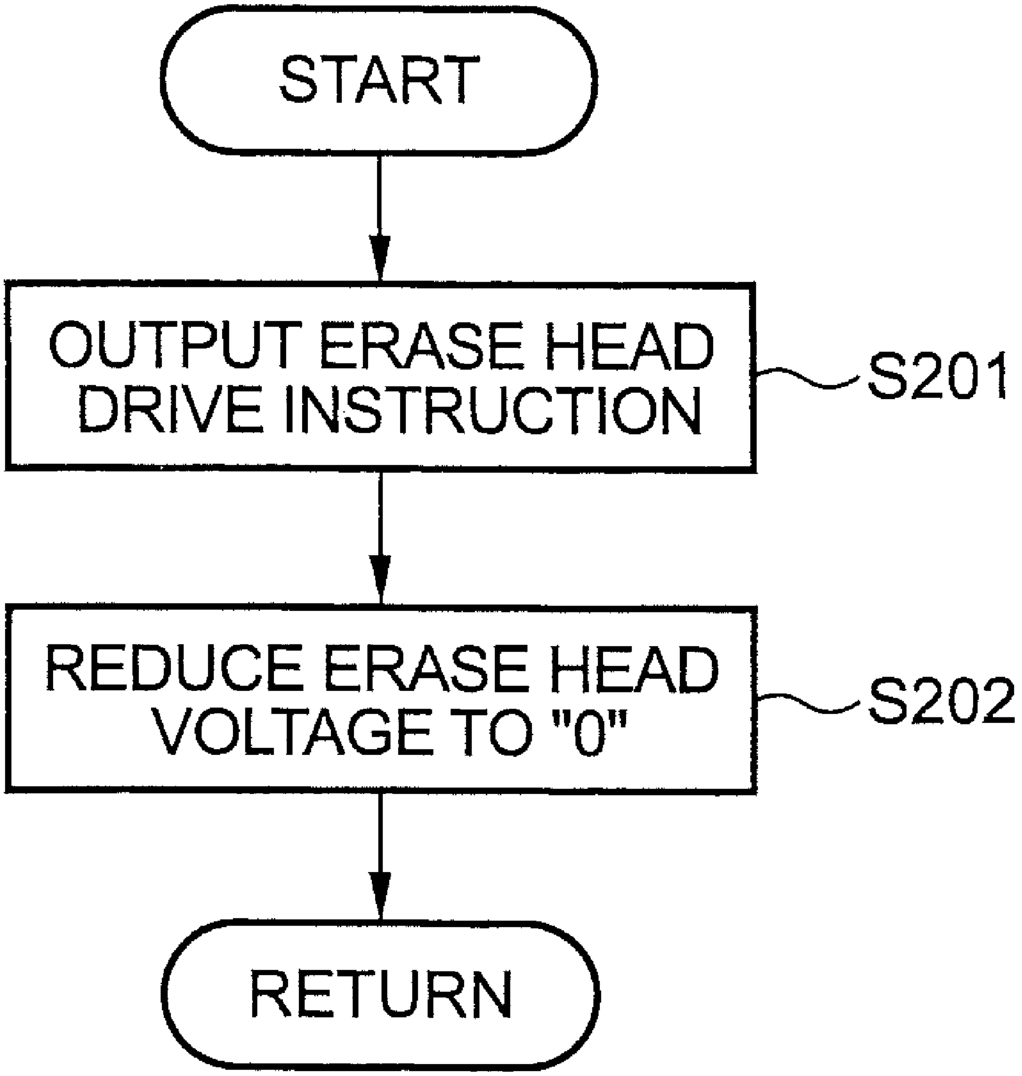
FIG. 18 is a flowchart of a one-line erasing process of the rewriting process for color electronic paper in FIG. 12.

Next, the one-line erasing process, which is executed in step S105 of the rewriting process for color electronic paper, will be described in accordance with a flowchart of FIG. 18. When the one-line erasing process is executed, first, in step S201 of the process, the main control unit 101 outputs, to the erase head drive circuit 109, an erase head drive instruction for driving the erase head 25 such that the first charged particles 228 of the microcapsules 225 in a region opposed to the lower surface of the erase head 25 move to the display surface side. More specifically, the main control unit 101 charges the first pixel electrodes 28 of the erase head 25 positively to generate an electric field directed to the paper feed roller 24 (an electric field directed to the lower side in FIG. 12).

Next, the main control unit 101 shifts to step S202 and outputs, to the erase head drive circuit 109, an erase head stop instruction for stopping drive of the erase head 25 such that a voltage between the erase head 25 and the paper feed roller 24 is reduced to "0", and then returns to the rewriting process for color electronic paper.

Figure 19:
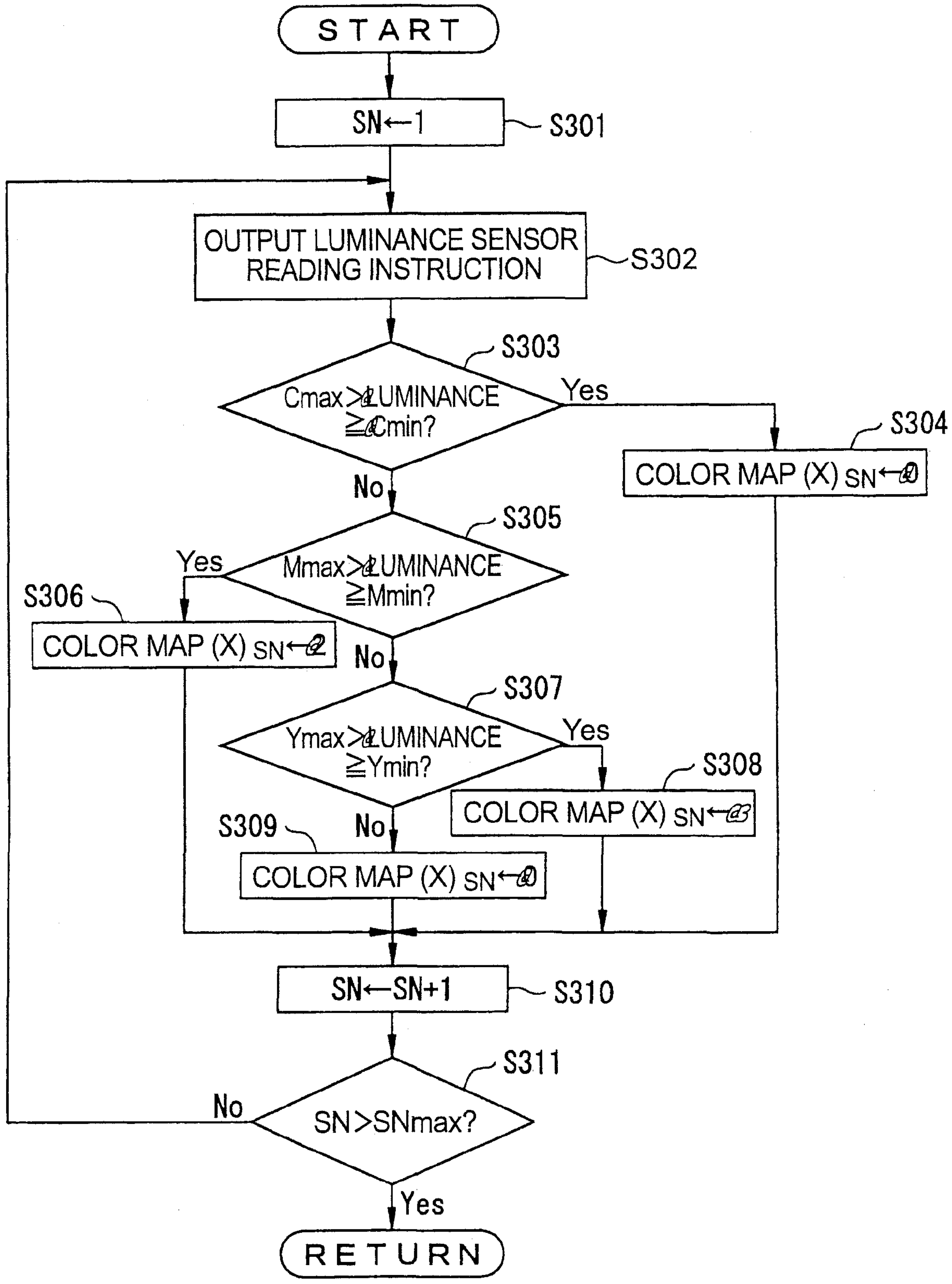
FIG. 19 is a flowchart of a color position storage process of the rewriting process for color electronic paper in FIG. 12.

Next, the color position storage process, which is executed in step S106 of the rewriting process for color electronic paper, will be described in accordance with a flowchart of FIG. 19. When the color position storage process is executed, first, in step S301 of the process, the main control unit 101 initializes a variable SN corresponding to a luminance sensor position to be "1".

Next, the main control unit 101 shifts to step S302 and outputs, as shown in FIG. 15, to the luminance detection circuit 106, a luminance reading instruction for driving the luminance sensor 29 so as to read a luminance of reflected light in a region opposed to the lower surface of the SNth luminance sensor 29 from the left end facing the luminance sensor array 26 from the writing head 27 side.

Next, the main control unit 101 shifts to step S303 and judges whether or not a luminance of cyan was detected in step S302. More specifically, the main control unit 101 judges whether or not the luminance read by the luminance sensor 29 in step S302 is a luminance generated by cyan (Cmax>luminance≧Cmin). If the luminance is a luminance generated by cyan (Yes), the main control unit 101 shifts to step S304, and if not (No), shifts to step S305.

Figure 20:
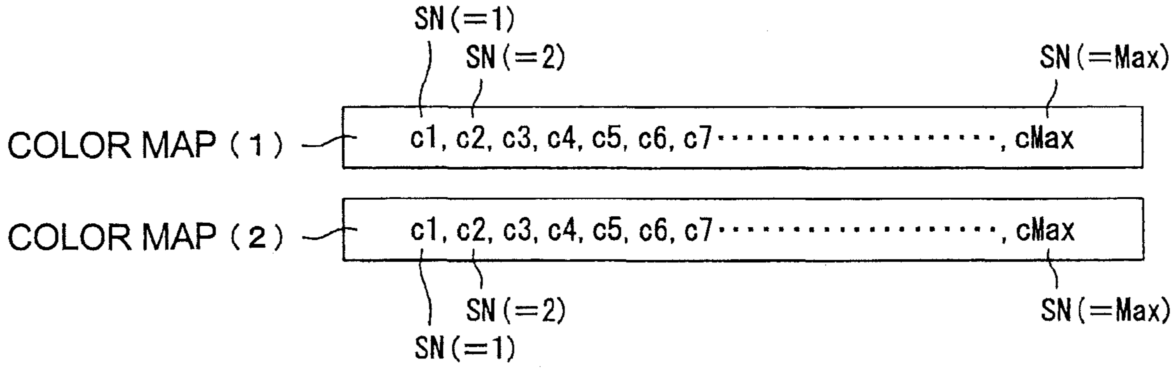
FIG. 20 is an explanatory diagram for explaining a color map for the rewriting process for color electronic paper in FIG. 12.

In step S304, the main control unit 101 selects a color map (X) corresponding to the variable X for color map storage, which was set in the rewriting process for color electronic paper, and stores "1" in an SNth storage region (in FIG. 20, an SNth storage region from the left) in the color map (X), and then shifts to step S310. Note that, as the color map (X) corresponding to the variable X for color map storage, as shown in FIG. 20, the main control unit 101 selects a color map (1) when the variable X for color map storage is set to "1" and selects a color map (2) when the variable X for color map storage is set to "2".

On the other hand, in step S305, the main control unit 101 judges whether or not a luminance of magenta was detected in step S302. More specifically, the main control unit 101 judges whether or not the luminance read by the luminance sensor 29 in step S302 is a luminance generated by magenta (Mmax>luminance≧Mmin). If the luminance is a luminance generated by cyan (Yes), the main control unit 101 shifts to step S307, and if not (No), shifts to step S308.

In step S306, the main control unit 101 selects a color map (X) corresponding to the variable X for color map storage, which was set in the rewriting process for color electronic paper, and stores "2" in an SNth storage region (in FIG. 20, an SNth storage region from the left) in the color map (X), and then shifts to step S310.

On the other hand, in step S307, the main control unit 101 judges whether or not a luminance of yellow was detected in step S302. More specifically, the main control unit 101 judges whether or not the luminance read by the luminance sensor 29 in step S302 is a luminance generated by yellow (Ymax>luminance≧Ymin). If the luminance is a luminance generated by yellow (Yes), the main control unit 101 shifts to step S308, and if not (No), shifts to step S309.

In step S308, the main control unit 101 selects a color map (X) corresponding to the variable X for color map storage, which was set in the rewriting process for color electronic paper, and stores "3" in an SNth storage region (in FIG. 20, an SNth storage region from the left) in the color map (X), and then shifts to step S310.

On the other hand, in step S309, the main control unit 101 selects a color map (X) corresponding to the variable X for color map storage, which was set in the rewriting process for color electronic paper, and stores "0" in an SNth storage region (in FIG. 20, an SNth storage region from the left) in the color map (X), and then shifts to step S310.

In step S310, the main control unit 101 adds "1" to the variable SN corresponding to a luminance sensor position to set a new variable SN corresponding to a luminance sensor position.

Next, the main control unit 101 shifts to step S311 and judges whether or not the variable SN corresponding to a luminance sensor position calculated in step S310 is larger than the number SNmax of the luminance sensors 29. If the variable SN is larger than the number SNmax of the luminance sensors 29 (Yes), the main control unit 101 ends this arithmetic operation process, and if not (No), shifts to step S302.

Figure 21:
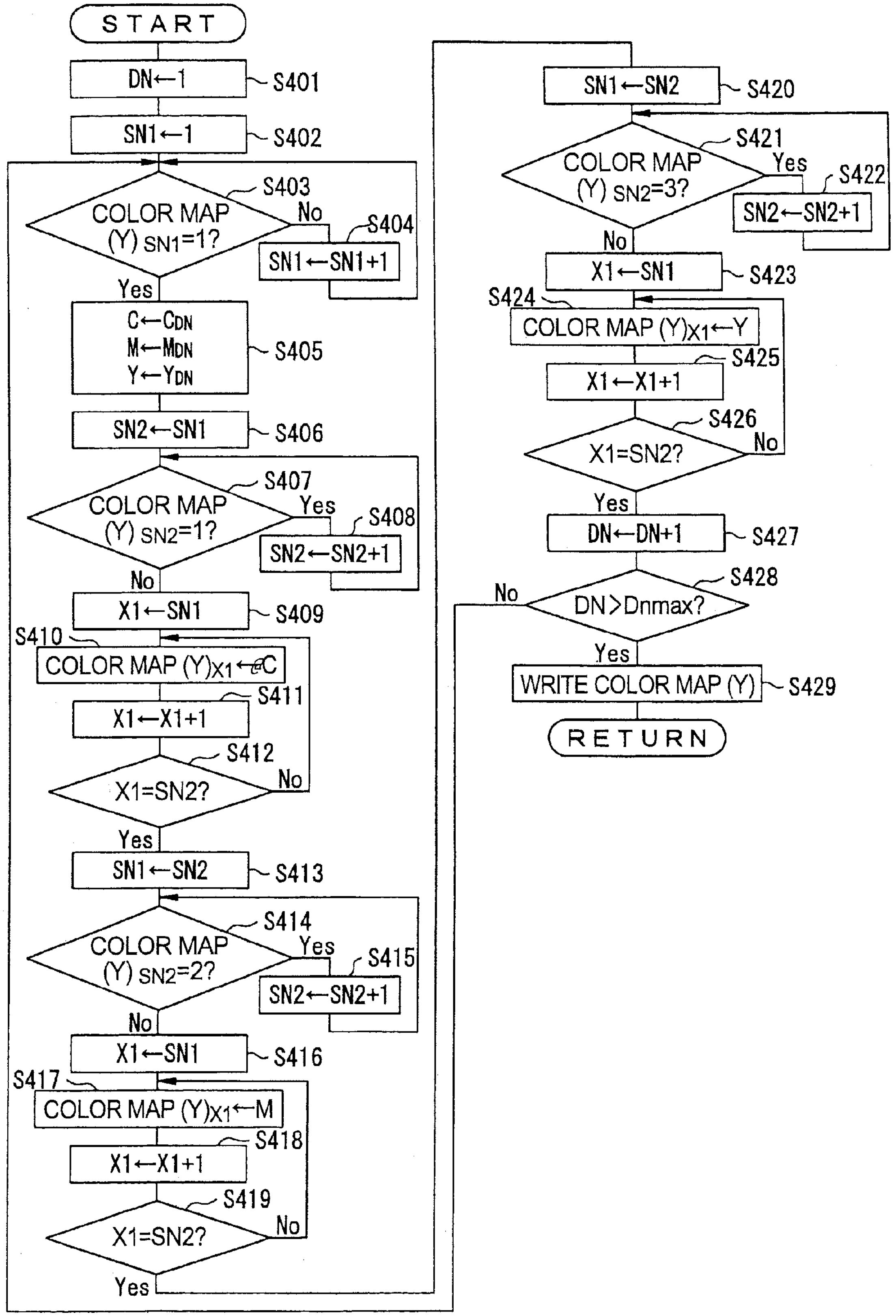
FIG. 21 is a flowchart of a one-line writing process of the rewriting process for color electronic paper in FIG. 12.

Next, the one-line writing process executed in step S107 of the rewriting process for color electronic paper will be described in accordance with a flowchart of FIG. 21. When the one-line writing process is executed, first, in step S401 of the process, a variable DN corresponding to a pixel position is initialized to be "1".

Next, the main control unit 101 shifts to step S402 and initializes a first variable SN1 to be "1".

Figure 22:
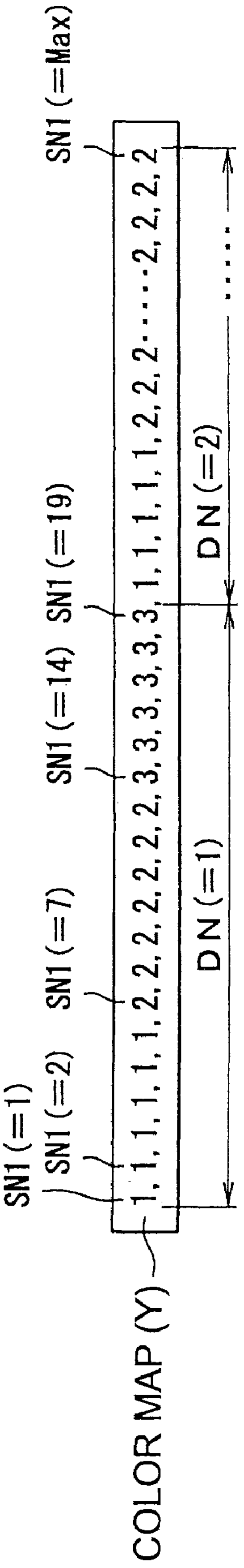
FIG. 22 is an explanatory diagram for explaining a color map of the rewriting process for color electronic paper in FIG. 12.

Next, the main control unit 101 shifts to step S403 and selects a color map (Y) corresponding to the variable Y for color map reading set in the rewriting process for color electronic paper. In addition, the main control unit 101 judges whether or not "1" (corresponding to cyan) is stored in an SN1st storage region in the color map (Y) as shown in FIG. 22. If "1" is stored therein (Yes), the main control unit 101 shifts to step S405, and if not (No), shifts to step S404. More specifically, the main control unit 101 selects a color map (1) when the variable Y for color map reading is set to "1", and selects a color map (2) when the variable Y for color map reading is set to "2".

In step S404, the main control unit 101 adds "1" to the first variable SN1 to calculate a new first variable SN1, and then shifts to step S403.

On the other hand, in step S405, as shown in FIG. 15, the main control unit 101 reads out compounding ratios $C_{DN}$, $M_{DN}$, and $Y_{DN}$ of cyan, magenta, and yellow of a display pattern which is drawn on a DNth pixel from the left end of the color electronic paper 22 existing between the writing head 27 and the paper feed roller 24, that is, a region opposed to the lower surface of the writing head 27. The main control unit 101 sets the compounding ratio $C_{DN}$ of cyan as a cyan compounding ratio C, the compounding ratio $M_{DN}$ of magenta as a magenta compounding ratio M, and the compounding ratio $Y_{DN}$ of yellow as a yellow compounding ratio Y.

Next, the main control unit 101 shifts to step S406 and sets a second variable SN2 to a value of the first variable SN1 set in step S404.

Next, the main control unit 101 shifts to step S407 and selects a color map (Y) corresponding to the variable Y for color map reading set in the rewriting process for color electronic paper. In addition, the main control unit 101 judges whether or not "1" (corresponding to cyan) is stored in an SN2nd storage region in the color map (Y) as shown in FIG. 22. If "1" is stored therein (Yes), the main control unit 101 shifts to step S408, and if not (No), shifts to step S409.

In step S408, the main control unit 101 adds "1" to the second variable SN2 to set a new second variable SN2, and then shifts to step S407.

On the other hand, in step S409, the main control unit 101 sets a third variable X1 to a value of the first variable SN1 set in step S404.

Next, the main control unit 101 shifts to step S410 and selects a color map (Y) corresponding to the variable Y for color map reading set in the rewriting process for color electronic paper. In addition, the main control unit 101 stores the cyan compounding ratio C, which was set in step S405, in an X1st storage region in the color map (Y) as shown in FIG. 22.

Next, the main control unit 101 shifts to step S411 and adds "1" to the third variable X1 to set a new third variable X1.

Next, the main control unit 101 shifts to step S412 and judges whether or not a value of the second variable SN2 set in step S408 is equal to a value of the third variable X1. If the value of the second variable SN2 is equal to the value of the third variable X1 (Yes), the main control unit 101 shifts to step S413, and if not (No), shifts to step S410.

Next, the main control unit 101 shifts to step S413 and sets the first variable SN1 to a value of the second variable SN2 set in step S408.

Next, the main control unit 101 shifts to step S414 and selects a color map (Y) corresponding to the variable Y for color map reading set in the rewriting process for color electronic paper. In addition, the main control unit 101 judges whether or not "2" (corresponding to magenta) is stored in the SN2nd storage region in the color map (Y) as shown in FIG. 22. If "2" is stored therein (Yes), the main control unit 101 shifts to step S415, and if not (No), shifts to step S416.

Next, the main control unit 101 shifts to step S415 and adds "1" to the second variable SN2 to set a new second variable SN2, and then shifts to step S414.

Next, the main control unit 101 shifts to step S416 and sets the third variable X1 to a value of the second variable SN2 set in step S415.

Next, the main control unit 101 shifts to step S417 and selects a color map (Y) corresponding to the variable Y for color map reading set in the rewriting process for color electronic paper. In addition, the main control unit 101 stores the magenta compounding ratio M, which was set in step S405, in the X1st storage region in the color map (Y) as shown in FIG. 22.

Next, the main control unit 101 shifts to step S418 and adds "1" to the third variable X1 to set a new third variable X1.

Next, the main control unit 101 shifts to step S419 and judges whether or not a value of the second variable SN2 set in step S415 is equal to the third variable X1. If the value of the second variable SN2 is equal to the third variable X1 (Yes), the main control unit 101 shifts to step S420, and if not (No), shifts to step S417.

Next, the main control unit 101 shifts to step S420 and sets the first variable SN1 to the value of the second variable SN2 set in step S415.

Next, the main control unit 101 shifts to step S421 and selects a color map (Y) corresponding to the variable Y for color map reading set in the rewriting process for color electronic paper. In addition, the main control unit 101 judges whether or not "3" (corresponding to yellow) is stored in the SN2nd storage region in the color map (Y) as shown in FIG. 22. If "3" is stored therein (Yes), the main control unit 101 shifts to step S422, and if not (No), shifts to step S423.

Next, the main control unit 101 shifts to step S422 and adds "1" to the second variable SN2 to set a new second variable SN2, and then shifts to step S421.

In step S423, the main control unit 101 sets the third variable X1 to a value of the second variable SN2 set in step S422.

Next, the main control unit 101 shifts to step S424 and selects a color map (Y) corresponding to the variable Y for color map reading set in the rewriting process for color electronic paper. In addition, the main control unit 101 stores the yellow compounding ratio Y, which was set in step S405, in the X1st storage region in the color map (Y) as shown in FIG. 22.

Next, the main control unit 101 shifts to step S425 and adds "1" to the third variable X1 to set a new third variable X1.

Next, the main control unit 101 shifts to step S426 and judges whether or not the second variable SN2 set in step S422 is equal to the third variable X1. If the second variable SN2 is equal to the third variable X1 (Yes), the main control unit 101 shifts to step S427, and if not (No), shifts to step S424.

In step S427, the main control unit 101 adds "1" to the variable DN corresponding to a pixel position to set a new variable DN corresponding to a pixel position.

Next, the main control unit 101 shifts to step S428 and judges whether or not the variable DN corresponding to a pixel position calculated in step S427 is larger than the number of pixels DNmax in the width direction of the color electronic paper 2. If the variable DN is larger than the number of pixels DNmax in the width direction of the color electronic paper 2 (Yes), the main control unit 101 shifts to step S429, and if not (No), shifts to step S403.

In step S429, the main control unit 101 selects a color map (Y) corresponding to the variable Y for color map reading set in the rewriting process for color electronic paper and outputs a writing head control instruction for driving the writing head 7 on the basis of the compounding ratios C, M and Y stored in the color map (Y) to the writing head control circuit 110. More specifically, the main control unit 101 drives the second pixel electrodes 210 such that a color of the first charged particles 228 of the microcapsule 225, which is in a region opposed to the lower surface of the Lth (L=1 to SNmax) second pixel electrode 210 from the left end, is displayed on the display surface of the color electronic paper 22 at a compounding ratio stored in an Lth storage region in the color map (Y).

Next, an operation of the rewriting device for color electronic paper 21 of this embodiment will be described.

First, it is assumed that a user placed the color electronic paper 22 in the vertical direction, that is, the longitudinal direction of the stripe region between the line head 23 and the paper feed roller 24. Then, the rewriting process for color electronic paper is executed by the control device 100 and, first, in step S101 of the process, a motor drive instruction is outputted to the motor drive circuit 118. Then, when the motor drive circuit 118 receives the motor drive instruction, the paper feed roller rotation motor 211 is driven to rotate, the paper feed roller 24 rotates, and the color electronic paper 22 moves from the erase head 25 side to the writing head 27 side by a length of one line.

In addition, the judgment in step S102 changes to "Yes", and the variable X for color map storage is set to "2" and the variable Y for color map reading is set to "1" in step S103, and the one-line erasing process is executed in step S105.

Figure 23:
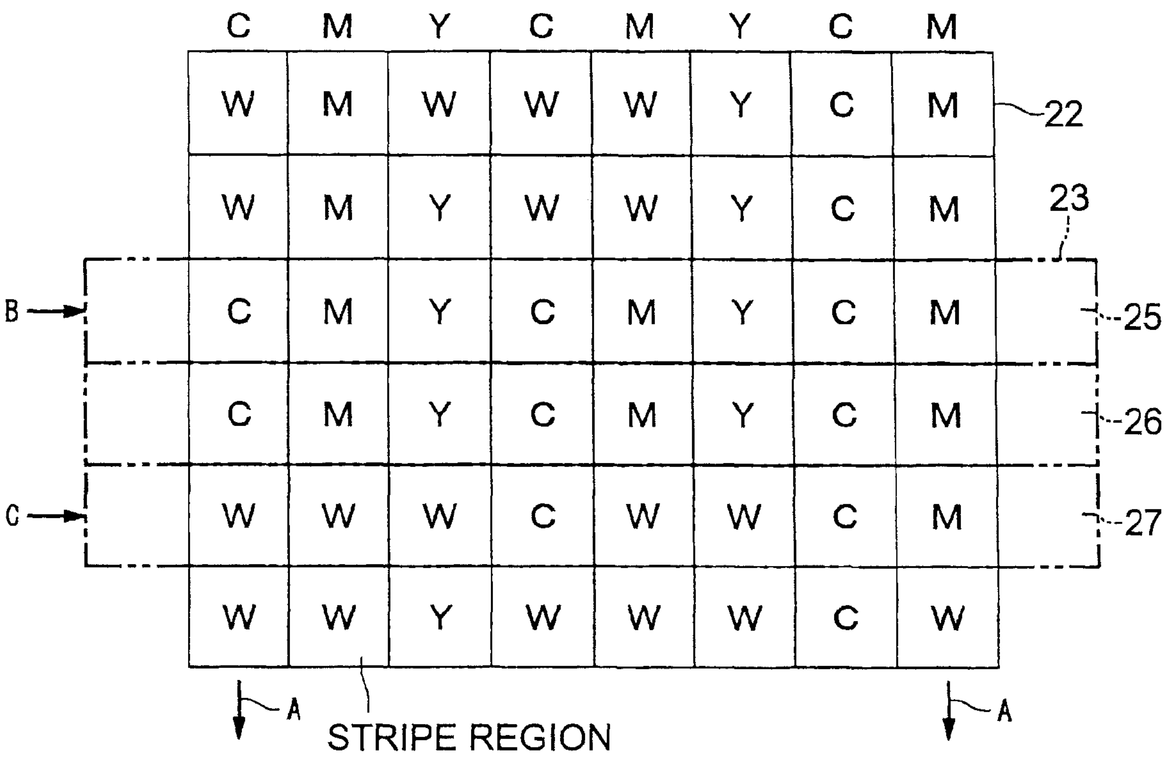
FIG. 23 is an explanatory diagram for explaining an operation of the rewriting process for color electronic paper in FIG. 12.

When the one-line erasing process is executed, first, in step S201 of the process, an erase head drive instruction is outputted to the erase head drive circuit 109 and, in step S202, an erase head stop instruction is outputted to the erase head drive circuit 109, and the main control unit 101 returns to the rewriting process for color electronic paper. Then, when the erase head drive circuit 109 acquires the erase head drive instruction, an electric field is applied toward the lower side in FIG. 12 to the color electronic paper 22 existing between the erase head 25 and the paper feed roller 24 by the erase head 25, and the first charged particles 228 encapsulated in the microcapsules 225 move to the display surface side. Then, as shown in B column of FIG. 23, a color of the first charged particles 228 appears on the display surface of the color electronic paper 22. In addition, when the erase head drive circuit 109 acquires the erase head stop instruction, the erase head 25 is stopped, and a voltage between the erase head 25 and the paper feed roller 24 is reduced to "0".

Further, when the main control unit 101 returns to the rewriting process for color electronic paper, in step S106 of the process, the color position storage process is executed. When the color position storage process is executed, first, in step S301 of the process, the variable SN corresponding to a luminance sensor position is initialized to be "1" and, in step S302, a luminance reading instruction is outputted to the luminance detection circuit 106. Then, when the luminance detection circuit 106 acquires the luminance reading instruction, as shown in FIG. 15, the first luminance sensor 29 from the left end facing the luminance sensor array 26 from the writing head 27 side reads a luminance of reflected light of the color electronic paper 22 in a region opposed to the lower surface of the luminance sensor 29 (i.e., a luminance of reflected light of a color of the first charged particles 228 which were moved to the display surface side of the color electronic paper 22 in the one-line erasing process when the rewriting process for color electronic paper was executed last time).

Here, it is assumed that the first charged particles 228 in the region opposed to the lower surface of the luminance sensor 29 are colored in cyan, that is, cyan is displayed in the region of the color electronic paper 22. Then, the judgment in step S303 changes to "Yes" and, in step S304, as shown in FIG. 20, a color map (X) corresponding to the variable X for color map storage set in the rewriting process for color electronic paper, that is, the color map (1) is selected, and "1" is stored in a first storage region (in FIG. 20, a first storage region from the left) in the color map (1). In step S310, "1" is added to the variable SN corresponding to a luminance sensor position and a new variable SN corresponding to a luminance sensor position (=2) is calculated. Then, the judgment in step S311 changes to "No", and the main control unit 101 shifts to step S302 again.

Then, while the above-mentioned flow is repeated, as shown in FIG. 22, all colors of the first charged particles 228 in the region opposed to the lower surface of the respective luminance sensors 29 are stored in color map (1). In addition, if the variable SN corresponding to a luminance sensor position becomes larger than the number SNmax of the luminance sensors 29, the judgment in step S311 changes to "Yes", and the main control unit returns to the rewriting process for color electronic paper.

In addition, when the main control unit 101 returns to the rewriting process for color electronic paper, in step S107 of the process, the one-line writing process is executed. When the one-line writing process is executed, first, in step S401 of the process, the variable DN corresponding to a pixel position is initialized to be "1" and, in step S402, the first variable SN1 is initialized to be "1".

Here, it is assumed that "1" (corresponding to cyan) is stored in a first storage region (in FIG. 22, a first storage region from the left) in the color map (Y) corresponding to the variable Y for color map reading set in the rewriting process for color electronic paper, that is, the color map (2). Then, the judgment in step S403 changes to "Yes" and, in step S405, the compounding ratios $C_{DN}$, $M_{DN}$, and $Y_{DN}$ of cyan, magenta, and yellow included in the display pattern, which is drawn on a first pixel from the left end of the color electronic paper 22 existing between the writing head 27 and the paper feed roller 24 as shown in FIG. 15, are read out from the RAM 104. In addition, the compounding ratio $C_{DN}$ of cyan is set as the cyan compounding ratio C, the compounding ratio $M_{DN}$ of magenta is set as the magenta compounding ratio M, and the compounding ratio $Y_{DN}$ of yellow is set as the yellow compounding ratio Y. In step S406, the second variable SN2 is set to a value of the first variable SN1 (=1), and the judgment in step S407 changes to "Yes". In step S408, "1" is added to the second variable SN2 and a new second variable SN2 (=2) is set. The main control unit 101 shifts to step S407 again, and the above-mentioned flow is repeated.

Here, as shown in FIG. 22, it is assumed that "2" (corresponding to magenta) is stored in a seventh storage region (in FIG. 22, a seventh storage region from the left) in the color map (2). Then, when the above-mentioned flow is repeated and the second variable SN2 changes to "7", the judgment in step S407 changes to "No". In step S409, the third variable X1 is set to the value of the first variable SN1 (=1). In step S410, as shown in FIG. 11, the cyan compounding ratio C is stored in the first storage region in the color map (2). In step S411, "1" is added to the third variable X1 to set a new third variable X1 (=2). The judgment in step S412 changes to "No", the main control unit 101 shifts to step S410 again, and the above-mentioned flow is repeated.

It is assumed that the third variable X1 changes to "8" while the above-mentioned flow is repeated. Then, the judgment in step S412 changes to "Yes". In step S413, the first variable SN1 is set to the value of the second variable SN2 (=7), the judgment in step S414 changes to "Yes". In step S415, "1" is added to the second variable SN2, and a new second variable SN2 (=8) is set. The main control unit 101 shifts to step S414 again, and the above-mentioned flow is repeated.

Here, it is assumed that, as shown in FIG. 22, "3" (corresponding to yellow) is stored in a fourteenth storage region (in FIG. 22, a fourteenth storage region from the left) in the color map (2). Then, when the above-mentioned flow is repeated and the second variable SN2 changes to "14", the judgment in step S414 changes to "No". In step S416, the third variable X1 is set to the value of the first variable SN1 (=7). In step S417, as shown in FIG. 22, the magenta compounding ratio M is stored in the seventh storage region in the color map (2). In step S418, "1" is added to the third variable X1 to set a new third variable X1 (=8). The judgment in step S419 changes to "No", the main control unit 101 shifts to step S417 again, and the above-mentioned flow is repeated.

It is assumed that the third variable X1 changes to "14" while the above-mentioned flow is repeated. Then, the judgment in step S419 changes to "Yes". In step S420, the first variable SN1 is set to the value of the second variable SN2 (=14). The judgment in step S421 changes to "Yes". In step S422, "1" is added to the second variable SN2, and a new second variable SN2 (=15) is set. The main control unit 101 shifts to step S421 again, and the above-mentioned flow is repeated.

Here, it is assumed that, as shown in FIG. 22, "1" (corresponding to cyan) is stored in a twentieth storage region (in FIG. 22, a twentieth storage region from the left) in the color map (2). Then, when the above-mentioned flow is repeated and the second variable SN2 changes to "20", the judgment in step S421 changes to "No". In step S423, the third variable X1 is set to the value of the first variable SN1 (=14). In step S424, as shown in FIG. 22, the yellow compounding ratio Y is stored in the fourteenth storage region in the color map (2). In step S425, "1" is added to the third variable X1 to set a new third variable X1 (=15). The judgment in step S426 changes to "No", the main control unit 101 shifts to step S426 again, and the above-mentioned flow is repeated.

It is assumed that the third variable X1 changes to "20" while the above-mentioned flow is repeated. Then, the judgment in step S426 changes to "Yes". In step S427, "1" is added to the variable DN corresponding to a pixel position to set a new variable DN corresponding to a pixel position (=2). In addition, the judgment in step S428 changes to "No", the main control unit 101 shifts to step S403 again, and the above-mentioned flow is repeated.

Figure 24:
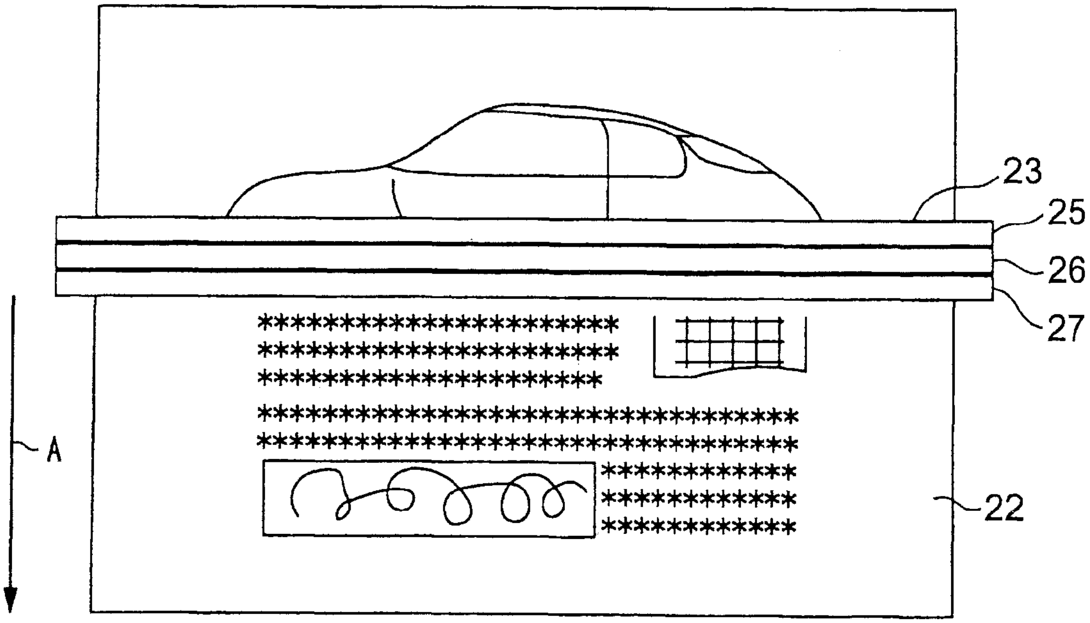
FIG. 24 is an explanatory diagram for explaining an operation of the rewriting process for color electronic paper in FIG. 12.

Then, it is assumed that, while the above-mentioned flow is repeated, all the compounding ratios of cyan, magenta, and yellow of the display pattern to be drawn on the region opposed to the lower surface of the respective second pixel electrodes 210 are stored in the color map (2), and the variable DN corresponding to a pixel position becomes larger than the number of pixels DNmax in the width direction of the color electronic paper 22. Then, the judgment in step S428 changes to "Yes". In step S429, a writing head control instruction is outputted to the writing head control circuit 117 on the basis of the compounding ratios C, M and Y stored in the color map (2). Then, when the writing head control circuit 117 acquires the writing head control instruction, the second pixel electrode 210 is driven, an electric field is applied to a region opposed to the lower surface of the respective second pixel electrodes 210, the first charged particles 228 encapsulated in the microcapsules 225 move to the display surface side, and a color of the first charged particles 228 of the microcapsule 225, which is in the region opposed to the lower surface of the Lth (L=1 to SNmax) second pixel electrode 210 from the left end, appears on the display surface of the color electronic paper 22 at the compounding ratio stored in the Lth storage region in the color map (2). As shown in FIG. 24, a display pattern is drawn on the color electronic paper 22.

As described above, according to the writing device of this embodiment, a voltage can be applied to the respective microcapsule 25 of the color electronic paper 22 individually. In other words, the writing device of this embodiment is a device which can perform writing with respect to color electronic paper.

Third Embodiment

Embodiment of the Second Writing Device of the Present Invention

A third embodiment is different from the second embodiment in that a display pattern of the color electronic paper 2, in which a plurality of stripe regions extend in the width direction, is rewritten.

Figure 25:
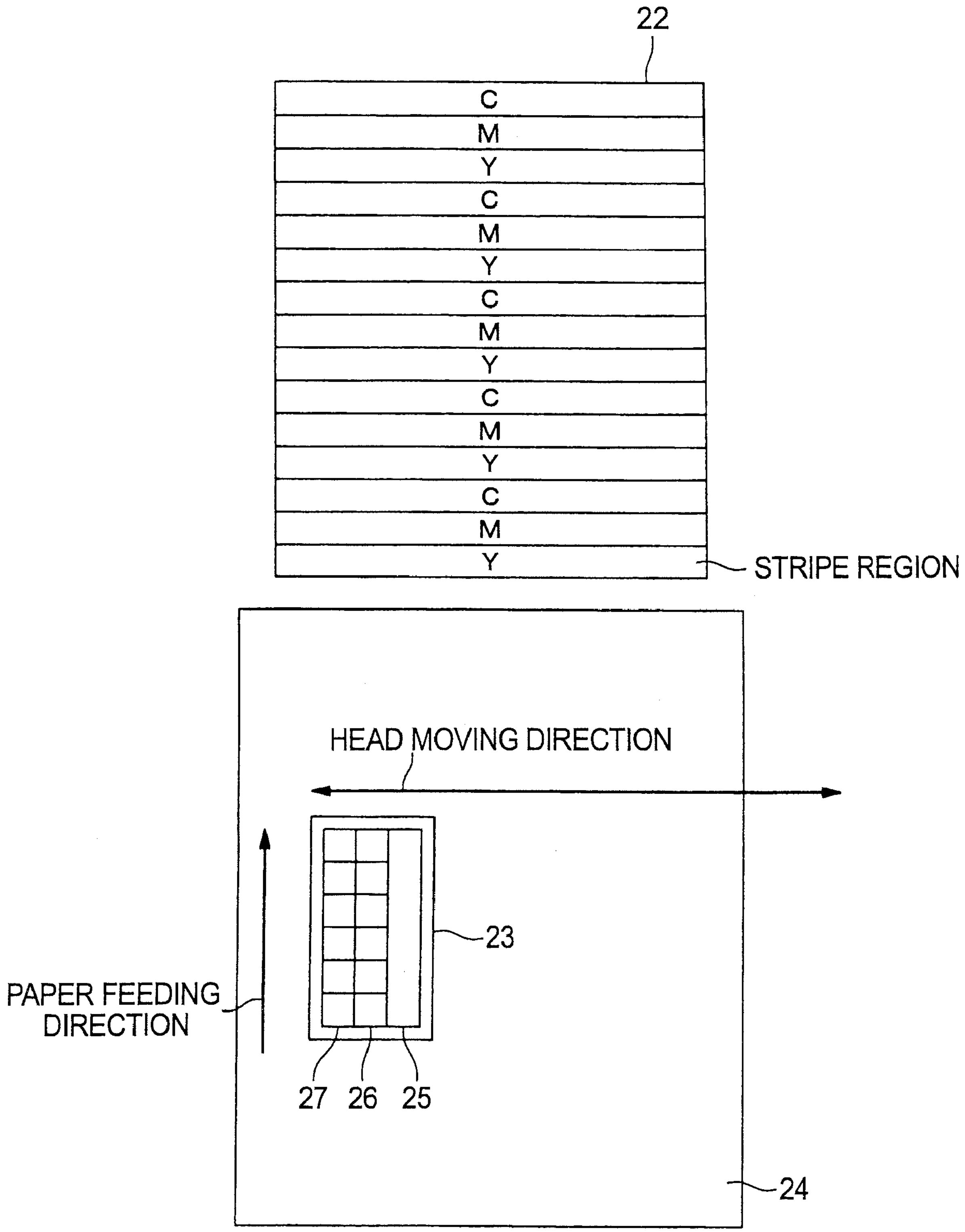
FIG. 25 is a plan view showing a writing device (a rewriting device for color electronic paper) of a third embodiment.

More specifically, as shown in FIG. 25, a longitudinal direction of a relatively short line head 23 is arranged in a direction perpendicular to the axis of the paper feed roller 24, that is, perpendicular to the longitudinal direction of the stripe regions of the color electronic paper 22 (the erase head 25, the luminance sensor array 26, and the writing head 27 are arrange side by side so as to be along a direction perpendicular to the longitudinal direction of the strip regions), and a not-shown drive mechanism, which moves the line head 23 in the axis direction of the paper feed roller 24, is provided.

Further, in the rewriting process for color electronic paper executed in the control device 100, a procedure of causing the paper feed roller 24 to convey the color electronic paper 22 in the vertical direction by several lines (e.g., by a length in the longitudinal direction of the line head 23) and drawing a display pattern in the several lines with the line head 23 is repeated to draw the display pattern on the entire color electronic paper 22.

Fourth Embodiment

Embodiment of the Second Writing Device of the Present Invention

A fourth embodiment is different from the second embodiment in that one luminance sensor 29 is arranged in the line head 23 instead of the luminance sensor array 26 consisting of the plurality of luminance sensors 29.

Figure 26:
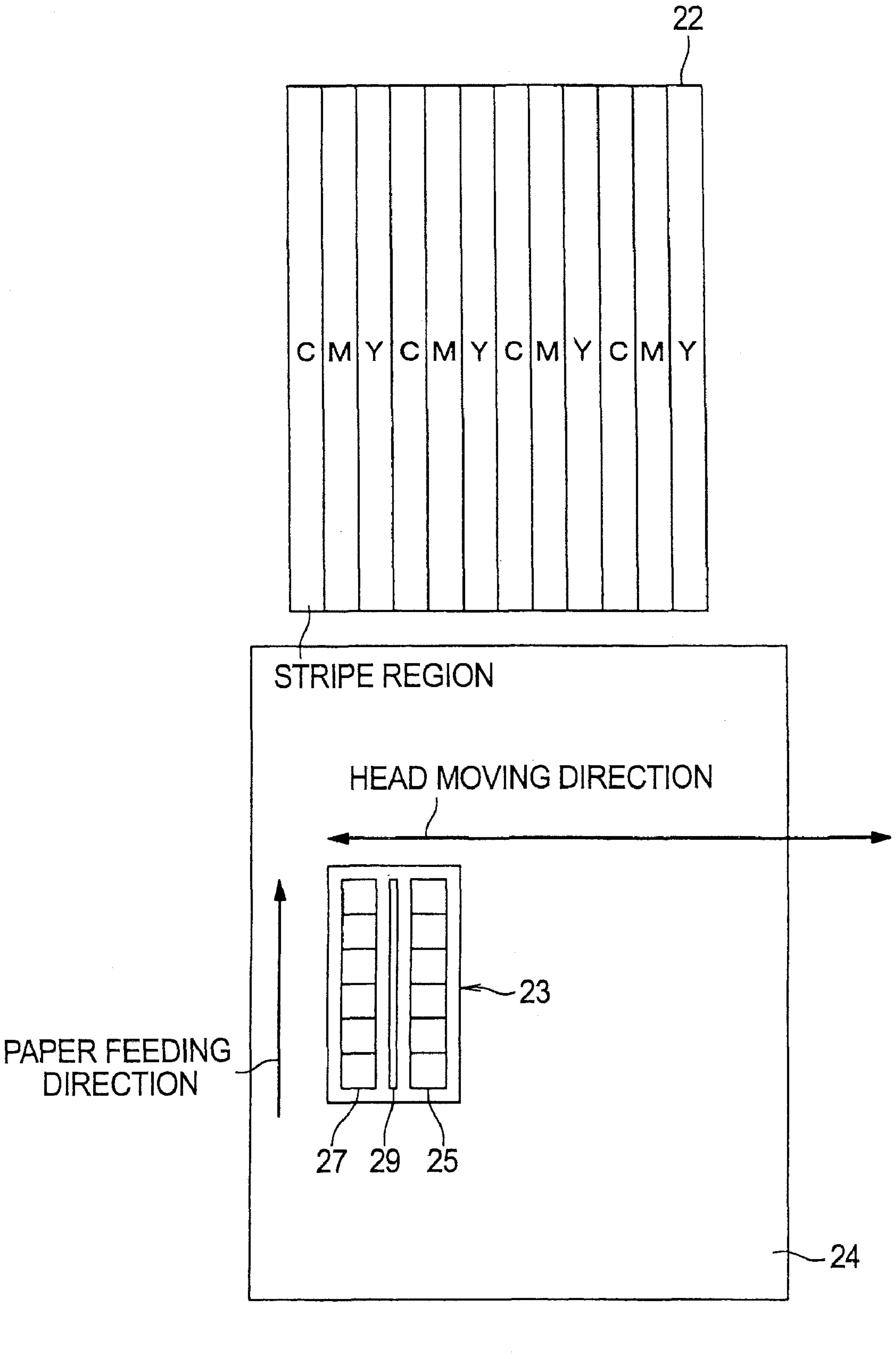
FIG. 26 is a plan view showing a writing device (a rewriting device for color electronic paper) of a fourth embodiment.

More specifically, as shown in FIG. 26, a longitudinal direction of a relatively short line head 23 is arranged in a direction perpendicular to the axis of the paper feed roller 24, that is, parallel to the longitudinal direction of the stripe regions of the color electronic paper 22 (the erase head 25, the luminance sensor 25, and the writing head 27 are arrange side by side so as to be along the longitudinal direction of the stripe regions), and a not-shown drive mechanism, which moves the line head 23 in the axis direction of the paper feed roller 24, is provided.

Further, in the rewriting process for color electronic paper executed in the control device 100, a procedure of causing the paper feed roller 24 to convey the color electronic paper 22 in the vertical direction by several lines (e.g., by a length in the longitudinal direction of the line head 23) and drawing a display pattern in the several lines with the line head 23 is repeated to draw the display pattern on the entire color electronic paper 22.

Figure 27:
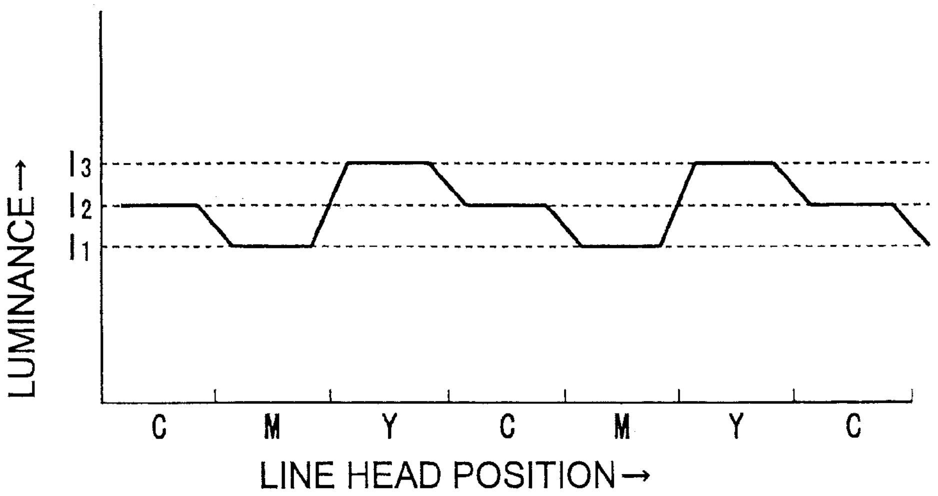
FIG. 27 is an explanatory view for explaining an operation of the writing device of the fourth embodiment.

Note that, as shown in FIG. 27, when the line head 23 is moved in the axial direction of the paper feed roller 24, a luminance of the display surface of the color electronic paper 22 is continuously detected by the luminance sensor 29 to detect a center of the stripe regions, whereby the writing head 27 is positioned accurately on the stripe regions.

In addition, in the above-mentioned embodiments, cyan, magenta, and yellow are equivalent to a plurality of colors, the microcapsules 225 are equivalent to encapsulating regions, the first pixel electrodes 28 are equivalent to the first voltage applicator, the luminance sensors 29 are equivalent to the color detector, and the second pixel electrodes 210 are equivalent to the second voltage applicator.

Further, the above-mentioned embodiments show examples of the writing device for color electronic paper and writing method for color electronic paper and do not limit a structure or the like of the apparatus.

Figure 28:
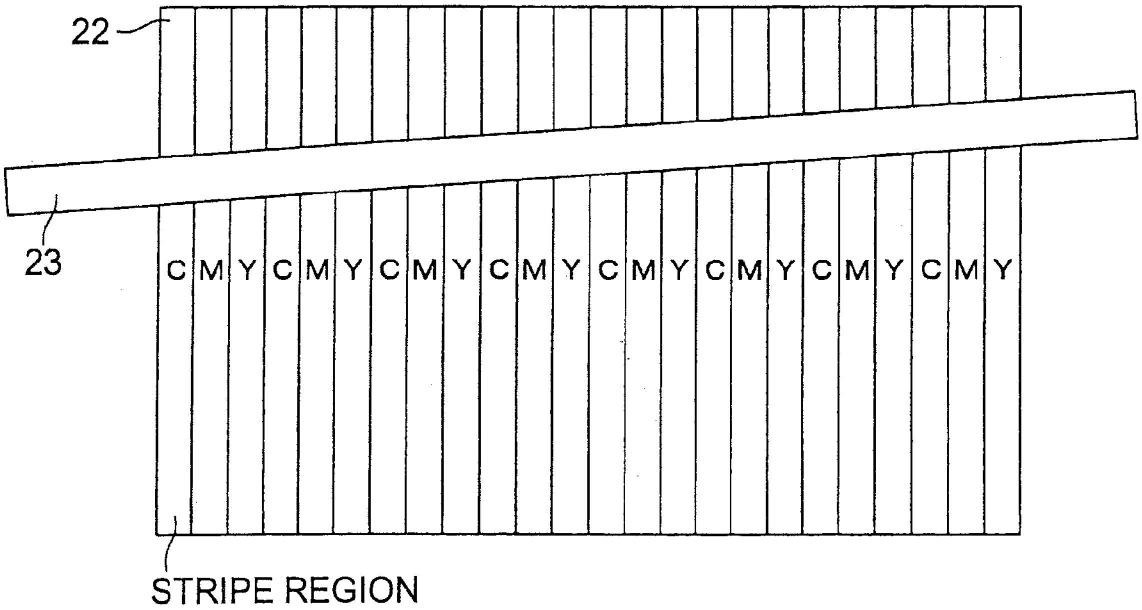
FIG. 28 is an explanatory view for explaining a state in which a line head is dislocated in the writing devices of the second and fourth embodiments.

In the second and the fourth embodiments, the longitudinal direction of the line head 23 is arranged in a specific direction perpendicular to the longitudinal direction of the stripe regions of the color electronic paper 22. However, for example, as shown in FIG. 28, the longitudinal direction of the line head 23 may be slightly dislocated (disoriented) from the specific direction.

In addition, rather than providing the writing device for color electronic paper 21 separately from the color electronic paper 22, for example, a large color electronic paper 22 of an A1 size and the line head 23 may be formed integrally. In that way, a rewritable poster can be realized inexpensively.

Moreover, rather than causing all the microcapsules 225 in the same pixel, which enclose the first charged particles 228 colored in the same color of cyan, magenta, or yellow, to develop a color at the same compounding ratio (half tone dot %), for example, it is also possible to cause only a part of the microcapsules 225 to develop a color at the compounding ratio of 100% to have a predetermined compounding ratio as the pixels as a whole.

What is claimed is:

1. A writing device for performing writing with respect to electronic paper which includes a microcapsule layer having microcapsules whose appearance change depending upon a direction of an electric field, the writing device comprising:

an arrangement detector which detects an arrangement of the microcapsules in the microcapsule layer; and a voltage applicator which applies a voltage to each of the microcapsules based on a result of the arrangement detection by the arrangement detector, wherein a plurality of stripe regions are formed of a plurality of microcapsules each of which encapsulates common charged particles or dispersion media, and the arrangement detector and the voltage applicator are disposed along a direction perpendicular to a longitudinal direction of the stripe regions.

2. The writing device for electronic paper according to claim 1, further comprising:

a writing head which has pixel electrodes and a counter electrode which are arranged to be opposed to each other across the microcapsule layer, and performs electric field formation for each of the pixel electrodes with respect to the microcapsule layer according to image data.

3. The writing device for electronic paper according to claim 2, wherein the arrangement detector comprises a photodetector which detects reflected light from the microcapsules of the electronic paper via the writing head, and members of the writing head, which are arranged further on the photodetector side than the electronic paper, are optically transparent members capable of transmitting the reflected light.

4. The writing device for electronic paper according to claim 3, wherein the arrangement detector comprises a light-irradiating device which individually irradiates light on the microcapsules of the electronic paper.

5. The writing device for electronic paper according to claim 1, wherein the writing device and the electronic paper are formed integrally.

6. A writing device for electronic paper which applies a voltage to electronic paper with respective pixels formed of a plurality of encapsulating regions which encapsulate charged particles or dispersion media and displays the charged particles or dispersion media which are encapsulated in the plurality of encapsulating regions on a display surface, the writing device comprising:

a first voltage applicator which applies a voltage to a predetermined region of the electronic paper such that all the encapsulating regions in the predetermined region come into a first developed state;

a detector which detects which state is displayed on the display surface of the predetermined region when the voltage is applied by the first voltage applicator; and a second voltage applicator which applies a voltage to the predetermined region so as to control the developed state of the respective encapsulating regions in the predetermined region based on states of respective pixels forming a display image, which is displayed in the predetermined region, and a result of detection of the detector, wherein the first voltage applicator, the detector, and the second voltage applicator are in this order, wherein the first voltage applicator, the detector, and the second voltage applicator are in this order, a plurality of stripe regions are formed of a plurality of encapsulating regions which encapsulate common charged particles or dispersion media, and the first voltage applicator, the detector, and the second voltage applicator are disposed along a direction perpendicular to a longitudinal direction of the stripe regions.

7. The writing device for electronic paper according to claim 6, wherein a plurality of stripe regions are formed of a plurality of common encapsulating regions which encapsulate charged particles or dispersion media, and the first voltage applicator, the detector, and the second voltage applicator are disposed along a longitudinal direction of the stripe regions.

8. The writing device for electronic paper according to claim 6, wherein the writing device and the electronic paper are formed integrally.

9. A writing device for performing writing with respect to electronic paper which includes a microcapsule layer having microcapsules whose appearance change depending upon a direction of an electric field, the writing device comprising:

an arrangement detector which detects an arrangement of the microcapsules in the microcapsule layer; and an electric field controller which controls electric field formation for each of the microcapsules based on a result of the arrangement detection by the arrangement detector, wherein the writing device and the electronic paper are formed integrally.

10. The writing device for electronic paper according to claim 9, further comprising:

a writing head which has pixel electrodes and a counter electrode which are arranged to be opposed to each other across the microcapsule layer, and performs electric field formation for each of the pixel electrodes with respect to the microcapsule layer according to image data.

11. The writing device for electronic paper according to claim 10, wherein the arrangement detector comprises a photodetector which detects reflected light from the microcapsules of the electronic paper via the writing head, and members of the writing head, which are arranged further on the photodetector side than the electronic paper, are optically transparent members capable of transmitting the reflected light.

12. The writing device for electronic paper according to claim 11, wherein the arrangement detector comprises a light-irradiating device which individually irradiates light on the microcapsules of the electronic paper.

* * * * *